(12) United States Patent
Bonner et al.

(10) Patent No.: US 9,775,093 B2
(45) Date of Patent: Sep. 26, 2017

(54) ARCHITECTURE THAT MANAGES ACCESS BETWEEN A MOBILE COMMUNICATIONS DEVICE AND AN IP NETWORK

(75) Inventors: Thomas W. Bonner, Smyrna, GA (US); Judson J. Flynn, Decatur, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 3015 days.

(21) Appl. No.: 11/249,951

(22) Filed: Oct. 12, 2005

(65) Prior Publication Data
US 2007/0083470 A1    Apr. 12, 2007

(51) Int. Cl.
| | |
|---|---|
| *H04W 48/02* | (2009.01) |
| *H04W 4/20* | (2009.01) |
| *H04W 8/26* | (2009.01) |
| *H04W 12/06* | (2009.01) |
| *H04W 60/00* | (2009.01) |

(52) U.S. Cl.
CPC .. *H04W 48/02* (2013.01); *H04Q 2213/13176* (2013.01); *H04W 4/20* (2013.01); *H04W 8/265* (2013.01); *H04W 12/06* (2013.01); *H04W 60/00* (2013.01)

(58) Field of Classification Search
USPC ............ 379/219; 370/401; 455/554.1, 554.2, 455/555
See application file for complete search history.

(56) References Cited

U.S. PATENT DOCUMENTS

| | | | |
|---|---|---|---|
| 6,370,241 B1 | 4/2002 | Clark | |
| 6,480,717 B1 | 11/2002 | Ramaswamy | |
| 6,580,904 B2 | 6/2003 | Cox et al. | |
| 7,849,150 B2 * | 12/2010 | Loeebbert et al. | ........... 709/208 |

(Continued)

FOREIGN PATENT DOCUMENTS

| | | |
|---|---|---|
| CH | 694678 | 5/2005 |
| EP | 1633083 A1 | 3/2006 |

(Continued)

OTHER PUBLICATIONS

Frank J. Derfler, Jr, "How Networks Work", 2000, Que Corporation, Millenium Edition.*

(Continued)

*Primary Examiner* — Tsan-Yu J Huang
(74) *Attorney, Agent, or Firm* — Hartman & Citrin LLC

(57) ABSTRACT

Architecture which includes functionality in a handset and a network that automates an access point association and authorization procedure. The invention builds on a framework specified as part of a generic access network controller to enable the network to transparently and dynamically detect, control, and manage which access points are allowed for specific subscribers. The invention comprises a system that facilitates communications over a network including an access component that facilitates wireless communications over an unlicensed network that operates in an unlicensed frequency band (e.g., a home Wi-Fi network), and an authorization component that facilitates authorization of a mobile communications device (e.g., a cellular telephone) for communications over a mobile communications network (e.g., a cellular network) via the unlicensed network.

18 Claims, 19 Drawing Sheets

(56) References Cited

U.S. PATENT DOCUMENTS

| | | |
|---|---|---|
| 2001/0031636 A1* | 10/2001 | Hanson .................. 455/432 |
| 2002/0136226 A1* | 9/2002 | Christoffel et al. .......... 370/401 |
| 2002/0163938 A1 | 11/2002 | Tuomainen et al. |
| 2003/0139180 A1* | 7/2003 | McIntosh et al. ............ 455/426 |
| 2003/0216145 A1 | 11/2003 | Cox et al. |
| 2004/0218734 A1 | 11/2004 | Gilbert et al. |
| 2005/0101306 A1 | 5/2005 | Zabawskyj et al. |
| 2005/0108156 A1 | 5/2005 | Sumino et al. |
| 2005/0272438 A1 | 12/2005 | Holur et al. |

FOREIGN PATENT DOCUMENTS

| | | |
|---|---|---|
| EP | 1643676 A1 | 4/2006 |
| EP | 1670180 A1 | 6/2006 |
| WO | WO 2004109980 | 12/2004 |
| WO | WO 2005004384 | 1/2005 |
| WO | WO 2005032051 | 4/2005 |

OTHER PUBLICATIONS

U.S. Appl. No. 11/099,150, filed Apr. 4, 2005, Charles M. Link et al.

International Search Report and Written Opinion dated Apr. 27, 2007 in International Application No. PCT/US2006/040395.

Communication Pursuant to Article 94(3) EPC issued by the European Patent Office Examining Division on Feb. 16, 2011 in European Patent Application No. 06826040.5.

First Examination Report issued by the Indian Patent Office on Dec. 28, 2015 in Indian Patent Application No. 3274/DELNP/2008.

U.S. Office Action dated Aug. 10, 2006 in U.S. Appl. No. 11/099,150.

U.S. Office Action dated Mar. 7, 2007 in U.S. Appl. No. 11/099,150.

U.S. Office Action dated Aug. 8, 2007 in U.S. Appl. No. 11/099,150.

U.S. Advisory Action dated Dec. 28, 2007 in U.S. Appl. No. 11/099,150.

U.S. Office Action dated Feb. 7, 2008 in U.S. Appl. No. 11/099,150.

U.S. Office Action dated Aug. 19, 2008 in U.S. Appl. No. 11/099,150.

U.S. Office Action dated Jan. 22, 2009 in U.S. Appl. No. 11/099,150.

U.S. Advisory Action dated Apr. 28, 2009 in U.S. Appl. No. 11/099,150.

U.S. Notice of Allowance dated Aug. 20, 2009 in U.S. Appl. No. 11/099,150.

* cited by examiner

ARCHITECTURE THAT MANAGES ACCESS BETWEEN A MOBILE COMMUNICATIONS DEVICE AND AN IP NETWORK

TECHNICAL STATEMENT

This invention relates to data networks, and more specifically, to allowing access to a packet network via a cellular system.

BACKGROUND

The advent of the Internet has spawned a large numbers of users who can now access information that in the past was inaccessible. In a highly mobile society, technological advances in handheld and portable computing devices provide increasingly greater storage and computing power such that devices now are capable of handling many types of disparate data types such as images, video clips, audio data and textual data, for example.

Advances in wireless technology encourage the growth in wireless LANs (WLANs) not only in businesses, but also in the home computing environment where users typically have more than one computer, and cable routing problems are being overcome by inexpensive WLAN systems. WLANs have made it easier for the user to stay "connected" to network services via IEEE 802.11 wireless technologies, for example. Additionally, more businesses are realizing the benefit of increasing sales by providing WLAN "hot spots" to lure in customers. Thus, Wi-Fi hot spots are being installed in increasing numbers of businesses.

Similarly, mobile communications technology is rapidly advancing the exchange of information between users and systems. The user is no longer tied to a stationary device such as a personal computer in order to quickly message another user. Portable wireless devices such as cell phones and PDAs, for example, are becoming more robust with respect to messaging capabilities and the exchange of multimedia content.

Businesses are further realizing that the commercial benefits of merging technological aspects of the IP networks with cellular networks for the access of IP services are enormous. Cell phone subscribers can then access data that has long been available on IP networks via the cell phone, for example. Content that includes not only text, but now images, video and sound can be accessed via IP networks providing a rich experience for the cellular user. Additionally, VoIP (voice over IP) is a hot technology whereby users can place voice calls over the Internet thereby circumventing call charges that were once confined to traditional voice communications systems such as telephone companies. In view of the enormous popularity of unlicensed WLAN networks such as Wi-Fi, telephone companies as well as cellular providers are aggressively promoting such capabilities in order to stay competitive in this rapidly evolving area. However, there needs to be a mechanism that can efficiently and properly manage the marriage of cellular calls and unlicensed networks.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject invention is novel functionality in a handset and a network that automates access point association and authorization procedures. This concept builds on the framework specified as part of a generic access network (GAN) and GAN controller which enable the network to transparently and dynamically detect, control, and manage which access points are allowed for specific subscribers.

The invention disclosed and claimed herein, in one aspect thereof, comprises a system that facilitates communications over a network in accordance with an innovative aspect. The system can include an access component that facilitates wireless communications over an unlicensed network that operates in an unlicensed frequency band (e.g., a home Wi-Fi network), and an authorization component that facilitates authorization of a mobile communications device (MCD) (e.g., a cellular telephone) for communications over a mobile communications network (e.g., a cellular network) via the unlicensed network. The authorization component can include one or more databases and query engines that facilitate accessing subscriber cellular information the basis for which serves to authorize, deny, or limit access to the cellular mobile communications network through the unlicensed network.

In another aspect of the subject invention, systems and methodologies are disclosed that enable a subscriber to self report authorized access points using a secure web interface, using an over-the-air interface, and an interactive voice response system.

In yet another aspect thereof, systems and methodologies are disclosed that enable the sharing of Wi-Fi credentials with other handsets.

In still another aspect thereof, systems and methodologies are disclosed that process family plan subscriptions such that multiple handsets can be restricted to one or more unlicensed networks under the subscription plan.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
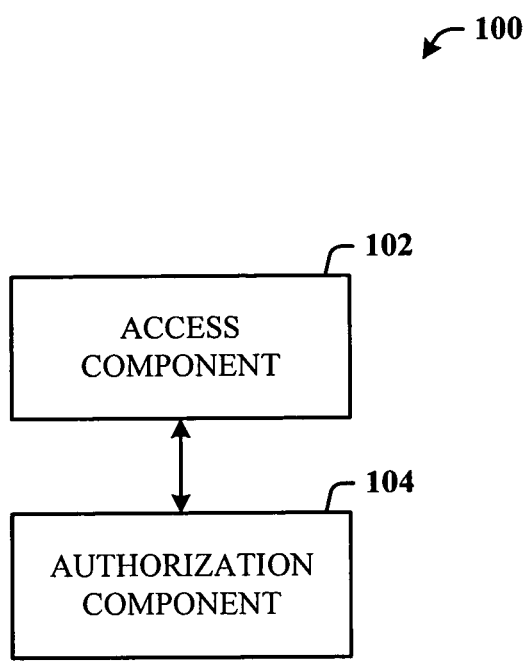
FIG. 1 illustrates a system that facilitates communications over a network in accordance with an innovative aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to the drawings, FIG. 1 illustrates a system 100 that facilitates communications over a network in accordance with an innovative aspect. The system can include an access component 102 that facilitates wireless communications over an unlicensed network that operates in an unlicensed frequency band (e.g., a home Wi-Fi network). The system 100 can also include an authorization component 104 that facilitates authorization of a mobile communications device (MCD) (e.g., a cellular telephone) for communications over a mobile communications network (e.g., a cellular network) via the unlicensed network. The authorization component 104 can include one or more databases and query engines that facilitate accessing subscriber cellular information the basis for which serves to authorize, deny, or limit access to the cellular mobile communications network through the unlicensed network.

In one exemplary illustration, a user (also called a customer or subscriber) purchases a cell phone (also called herein a mobile communications device or a handset) from a cellular provider and subscribes to a service whereby once properly authorized, the user can make cellular calls through a home wireless LAN system or UMA (unlicensed mobile access) service system (e.g., a Wi-Fi system). At a retail store, the customer can be instructed by a retail agent that the first access point (AP) that he or she authenticates with (e.g., handset-to-AP discovery and registration process) will be the primary AP or set of APs that the handset will support for UMA calls (e.g., voice over WLAN). The customer leaves the retail store with a handset provisioned for service (e.g., GSM-global system for mobile communications) with a feature code added for dual mode (or multimode) service, for example. At this point, the customer can be ready for UMA service, and a profile can exist in a UNC (UMA network controller)/AAA (authentication, access, and authorization) server. The only piece of information that can be missing is AP restriction data. As the user drives home, the user can utilize the standard cellular network (also called the "macro" system) through the handset (e.g., single mode handset, a dual-mode handset, multimode handset, . . . ).

When the user arrives home, the user can initiate a client process of the cell phone whereby the cell phone client communicates with a home AP device (e.g., wireless router, wireless gateway, wireless AP, . . . ) to extract unique AP data (e.g., a MAC (medium access control) address) or data that uniquely identifies the AP device with the user location (e.g., a cable modem or router or gateway MAC address). The client process can include receiving the AP MAC address (either manually and/or automatically) and communicating the MAC address with subscriber information (e.g., IMSI-international mobile subscriber identity) and/or cellular device information to the cellular network.

In one implementation, any APs that the customer passes from the time of leaving the service provider retail store to when the customer arrives home will not automatically authenticate for UMA service. In another implementation, any APs that the customer passes from the time of leaving the service provider retail store to when the customer arrives home will cause the mobile communications device client to automatically prompt the device user (or customer) to accept or deny authentication for UMA service.

The cellular network receives and processes the unique AP data and the mobile communications device data such that at least one of the data is checked against the subscriber information (e.g., the UNC/AAA data). In response to a successful validation, the cellular network allows the user to make cellular telephone calls through the unlicensed network and over the cellular network. If the validation is unsuccessful, for any reason, cellular communications over the unlicensed network is not allowed.

The handset seeking Wi-Fi and finding one through the device discovery process can be configured to require a response by the customer to accept and then register within UMA. The authentication for pairing and mating the UMA handset to APs can be configured to require a manual confirmation and acceptance through the communications device screen (e.g., via soft keys).

The user experience with the handset can avoid authentication by rogue APs by requiring customer initiation to begin the discovery and registration process between the handset and the AP(s). In one example, the request to begin linking and authenticating with any AP can be configured to start only through initiating the process of seeking Wi-Fi for registration through a Settings menu on the handset.

As indicated supra, the handset or mobile communications device can be a dual mode handset (e.g., GSM/CDMA (code division multiple access), GSM/3G (third generation by the 3G partnership project), iDEN (integrated dispatch enhanced network)/GSM, . . . ) and multimode handsets that include more than dual mode (e.g., three or more operating modes), for example.

Figure 2:
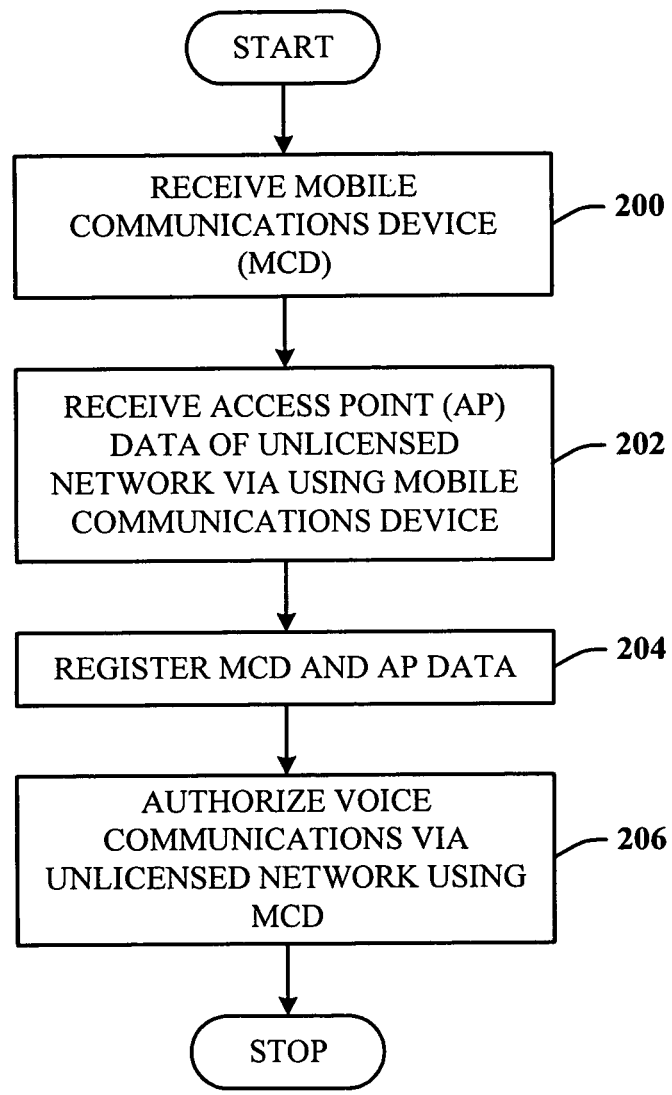
FIG. 2 illustrates a methodology of allowing unlicensed network access according to an aspect.

FIG. 2 illustrates a methodology of allowing unlicensed network access according to an aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, an MCD is received. At 202, an AP is received that provides access to an unlicensed network (e.g., an IEEE 802.11x network and/or an IEEE 802.16x network, where x represents any version of the associated standards). At 204, data of the MCD and the AP is registered as pair data on a cellular network. If registration is successful between the pair data and the cellular network (e.g., via the macro network), the MCD is authorized to communicate over the unlicensed network to the cellular network, as indicated at 206.

Figure 3:
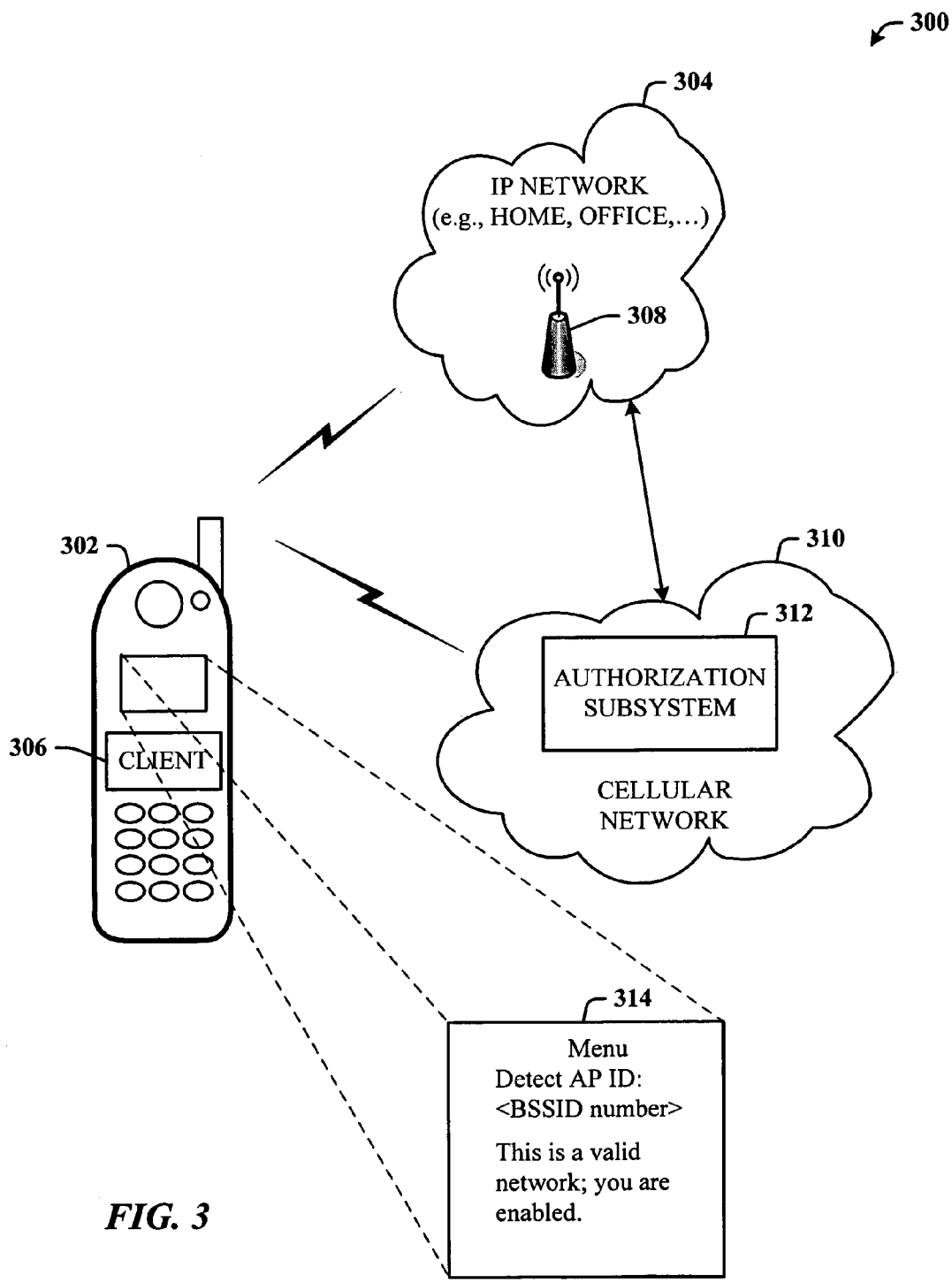
FIG. 3 illustrates a general diagram of a system that facilitates cellular communications via an unlicensed network in accordance with another aspect.

FIG. 3 illustrates a general diagram of a system 300 that facilitates cellular communications via an unlicensed network in accordance with another aspect. A handset user brings a mobile handset 302 within range of an unlicensed IP network 304 (e.g., a home network, office network, . . . ). The handset 302 can include a handset client 306 that facilitates communication with an AP 308 in order to obtain unique AP data (e.g., BSSID-basic service set identification data, or MAC address) of the AP 308 which is associated with the IP network 304. When the unique AP data is obtained, the handset 302 communicates the unique AP data and subscriber information to a cellular network 310 to a cellular authorization subsystem 312. When the unique AP data and subscriber information is successfully authorized, such results are signaled back to the handset client 306 via the cellular network 310. Thereafter, communications between the handset 302 through the AP 308 over the unlicensed IP network 304 to the cellular network 310 is authorized and successful.

When the user carries the handset 302 outside the radio range of the IP network 304, communications between the handset 302 and the unlicensed IP network 304 fails. Thus, the handset will then initiate communications over the macro network 310.

Where the unlicensed IP network 304 is implemented in a location that lacks cellular coverage, the handset 302 and its client 306 can capture and store the unique AP data in the handset 302. Thereafter, when the user carries the handset 302 into a location that has cellular coverage, the stored unique AP data and subscriber device information can be communicated to the cellular network 310 for authorization for unlicensed IP network 304 access by the cellular authorization subsystem 312. When the user then brings the handset 302 back into radio range of the IP network 304, cellular communications via the unlicensed IP network 304 to the cellular network 310 is authorized and operational.

The handset 302 can include a menuing system 314 that presents various options and/or information to the user. Consider that when the user arrives home for the first time (or this can be a configurable option such that the user can choose to manually interact with the handset 302 each time before Wi-Fi communications is allowed) the user can enter a menuing system that presents a menu item that indicates "recognize AP", or that conveys a similar meaning. In response, the handset 302 can display the BSSID, which is unique for his home. Alternatively, the user could obtain the BSSID from the AP off of a label, for example. It can be at this time that the user handset 302 is allowed to select the home AP(s) that are "visible" to the handset.

The handset 302 can detect and display the BSSID of each AP it detects, and the user can thereafter select one or more of the AP(s) with which to mate the handset 302. In one implementation, each BSSID would be acquired and presented along with some intuitive information that more clearly described the particular AP associated with the BSSID. For example, "this is the BSSID for a user home Wi-Fi". It is conceivable that the handset 302 will detect and display AP information for an AP that is not in the user's home or apartment, but in a neighbor's home or apartment. Thus, based on the signal strength, the handset 302 can be configured to present a prioritized list of BSSID data beginning with the AP having the strongest signal (most likely the user's) followed by the AP(s) associated with weaker signals.

As described infra, there can be a programming process that sends a USSD (unstructured supplementary service data) message up to the cellular network that includes at least the BSSID data. The cellular network can include the SCP (signal control point) that loads the BSSID into a client database which contains all of that pertinent information (e.g., IMSI assigned IP address, . . . ) associated with the cell phone. The database can be updated if that user is allowed to update this information. For example, the customer may only be allowed to update once each thirty days. Various algorithms and time restrictions are possible. For example, the customer is allowed only 24 hours or 48 hours to acquire the allowed number of APs (e.g., three APs). Once acquired, the user can change any of them, but has to wait thirty days. This prevents a rolling 10-day scenario, for example, where the user bypasses the carrier or network operator services altogether.

If the user is eligible to upgrade, a message can be sent back to the handset display. Whatever message received back from the SCP can show up directly on the handset display. Thus, messages such as "we can't upgrade your information at this time, it is within the 30-day window" or "information is updated, wireless access point is active" or the like can be quickly sent and perceived by the user.

When the information is sent to the handset 302, there can be some encoding in the information that can then cause the phone to camp on that wireless access point. For example, consider that an AP was acquired. The AP and cell phone information is uploaded to SCP the, and SCP accesses database with a request similar to the effect of, "can I update, and if I can, here's the info." The database replies "yes, you can update, and thank you." This information is received at the SCP, and the SCP sends an ACK (acknowledgement) back to handset 302. Additionally, the message can include mostly human-readable information as well as encoded information, which can include code that causes the handset 302 to effectively "lock down that BSSID, it is valid." Thus, the handset 302 knows that it is allowed to camp on the wireless access point.

Conversely, when uploaded to the master database, and the database denies access because the user would exceed the allotted number of associations, the SCP facilitates passing back a text message and encoding to the handset 302 that effectively says "do not camp on that wireless access point." Accordingly, the handset 302 has the intelligence not to camp on the next door neighbors wireless access point, but to remain on the macro (or cellular system) system. This can all be accomplished using various points of automation, ranging from a completely manual operation to a fully automated mechanism that is integrated into handset 302 with display capability to let the user know that a wireless access point is a valid point.

If the user gets a message back that indicates the AP is not a valid AP or based on some other circumstances, for example, the user's home was struck by lightning, and all the APs were destroyed, the user could now be prompted to call customer service for manual intervention to reset for different replacement APs.

Figure 4:
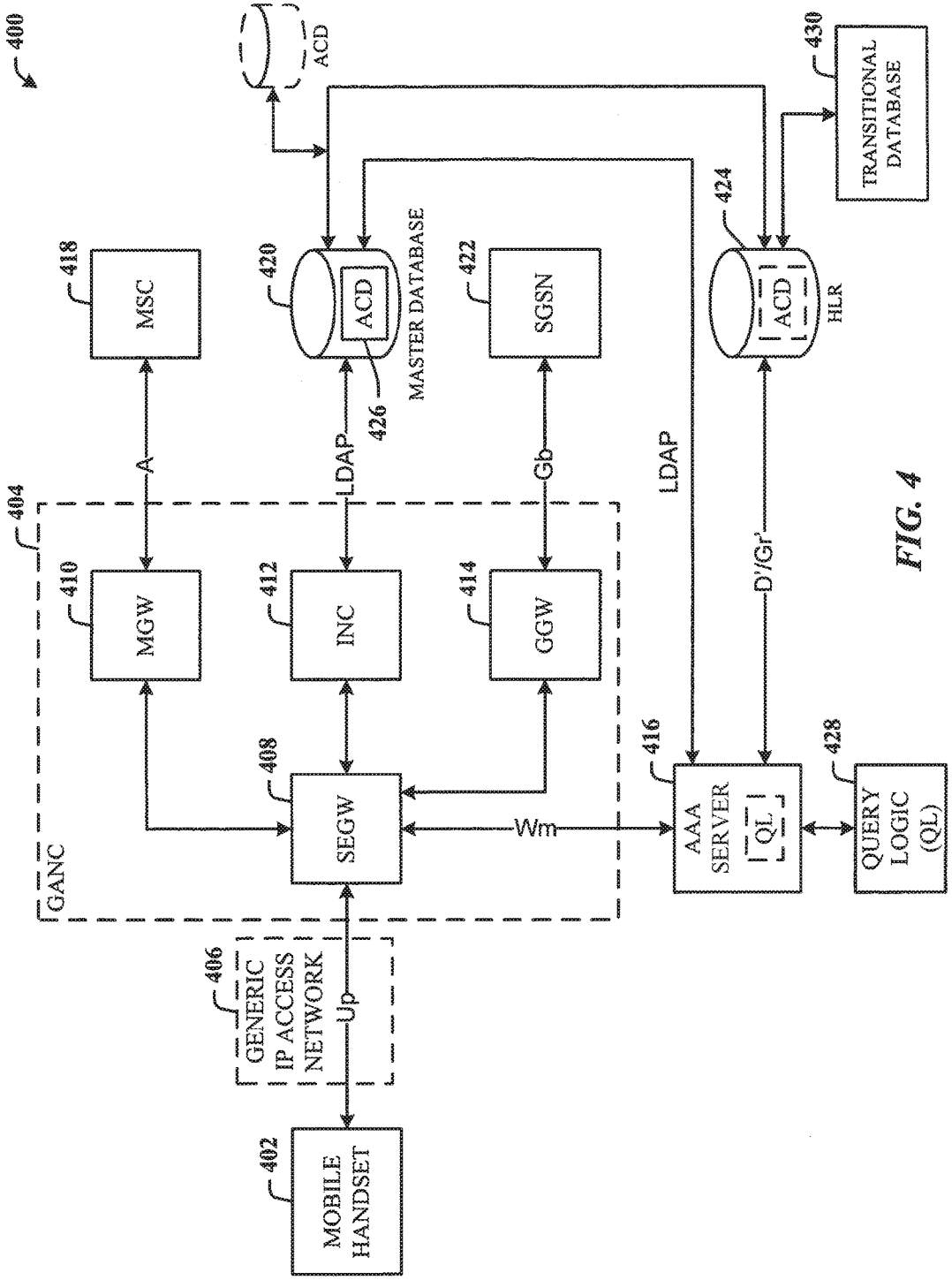
FIG. 4 illustrates a detailed schematic block diagram of a system that facilitates cellular communications via an unlicensed network in accordance with another aspect.

FIG. 4 illustrates a detailed schematic block diagram of a system 400 that facilitates cellular communications via an unlicensed network in accordance with another aspect. The system 400 illustrates a handset provisioning and control architecture. As illustrated in one implementation, this concept builds on the framework within the GAN (generic access network) architecture and adds functionality to a 3GPP AAA server and a master database network element. The GAN is an access network that provides access to A/Gb interfaces via an IP network.

For the purpose of illustrating the subject novel dynamic handset (e.g., dual mode handset-DMS) access control invention, a handset 402 can be a UMA handset. However, it is within contemplation of the subject innovation that IMS VoIP (IP multimedia subsystem-voice over IP) handsets can also be supported. Additionally, the invention can reuse the UMA identities during the UMA authentication and registration procedures.

The system 400 can include a GANC (GAN controller) system 404 to which the handset 402 communicates. A generic IP access network 406 provides connectivity between the handset 402 and the GANC 404. The GANC 404 is a network node that connects to a mobile switching center (MSC) 418 via an A-interface and a serving GPRS (general packet radio service) support node (SGSN) 422 via a Gb interface, and enables access via a generic IP network. The GANC 404 can perform three different logical roles: a provisioning role, a default role and a serving role.

The handset 402 interfaces to a security gateway (SEGW) 408 of the GANC 404 via a Up interface. The SEGW 408 element is part of the GANC 404 as defined in 3GPP TS 43.318 Generic Access to the A/Gb Interface; Stage 2 specification, the entirety of which is incorporated by reference herein. The SEGW 408 terminates secure remote access tunnels from the handset 402, providing mutual authentication, encryption and data integrity for signaling, voice and data traffic.

The GANC 404 further can include a media gateway (MGW) 410, an IP network controller (INC) 412, and a GPRS gateway (GGW) 414. The SEGW 408 interfaces to the MGW 410, the INC 412, the GGW 414, and an AAA server 416 via a Wm interface.

The MGW 410 further interfaces to an MSC 418 via an A interface. The INC 412 interfaces to a master database 420 using LDAP (lightweight directory access protocol), for example. LDAP describes a standard manner of organizing directory hierarchies and a standard interface for clients to access directory servers. The GGW 414 interfaces to an SGSN 422 via a Gb interface.

The AAA server 416, MSC 418, SGSN 422 and HLR (home location register) 424 form part of a HPLMN (home public land mobile network)/visiting PLMN.

The Up interface supports the capability to authenticate the handset 402 with the GANC 404 (for the purposes of establishing the secure tunnel) using GSM or UMTS (universal mobile telecommunications system) credentials. Authentication between handset 402 and GANC 404 can be performed using EAP-SIM (extensible authentication protocol-subscriber identity module) or EAP-AKA (authentication and key agreement) within an IKEv2 (Internet key exchange version 2) specification, which EAP-SIM and EAP-AKA also facilitate mutual authentication. The handset 402 and GANC-SEGW 408 establish a secure association for protecting signaling traffic and user-plane (voice and data) traffic.

The handset 402 connection with the GANC-SEGW 408 is initiated by starting the IKEv2 initial exchanges (IKE_SA_INIT). The EAP-SIM or EAP-AKA procedure is started as a result of these exchanges. The EAP-SIM procedure can be performed between the handset 402 and AAA server 416 that has access to the HLR 424 (or AuC (authentication center)/HSS (home subscriber server)) to retrieve subscriber information. The EAP-AKA procedure for the handset 402 with USIM and the handset 402 is capable of UMTS AKA, is performed between the handset 402 and AAA server 416. The GANC-SEGW 408 acts as a relay for the EAP-SIM/EAP-AKA messages. When the EAP-SIM/EAP-AKA procedure has completed successfully, the IKEv2 procedure can be continued to completion and the signaling channel between handset 402 and GANC-SEGW 408 is secured. The handset 402 and GAN can then continue with the discovery or registration procedure.

The AAA server 416 interfaces to the HLR 424 via a D'/Gr' interface. The GANC-SEGW 408 forwards the EAP Response/SIM-Start packet to the AAA Server 416. The AAA server 416 requests authentication data from the HLR 424 based on the IMSI. Note that the AAA server 416 could instead use cached triplets previously retrieved from the HLR 424 to continue the authentication process. The AAA server 416 receives multiple triplets from the HLR 424.

In GSM, the authentication is based on using GSM triplets, which are generated by a SIM at a subscriber's end and at the AuC of the network operator. The AuC is typically functionality provided by the HLR 424 of a GSM network. In GSM, the GSM triplets can be used in a rather relaxed way, so that their order is not strictly fixed. In UMTS, the authentication differs from GSM. In UMTS, the user authentication modules are referred to as UMTS SIMs (USIMs) and the AuC generates authentication vectors, or quintets, which comprise the following components: a random number RAND, an expected response XRES, a cipher key CK, an integrity key IK and an authentication token AUTN. Each authentication vector is good for one authentication. RAND, XRES and CK roughly correspond to RAND, SRES and Kc triplets of GSM.

An access control database (ACD) 426 is shown as part of the master database 420. The ACD 426 is utilized to associate an EAP-SIM permanent identity with an EAP-SIM pseudonym identity. The AAA server 416 queries the ACD 426 via LDAP to allow or deny EAP-SIM authentication requests received from the SEGW 408. The ACD 426 can also store and associate IMSI, BSSID, and originating IP address values. It is to be appreciated, however, that the ACD 426 can be located optionally in many different places (as illustrated by the box with dashed lines), for example, external to the master database 420, in the HLR 424 and/or as a node disposed on the connection between the master database 420 and the HLR 424. The master database 420 is a database that facilitates subscriber ID management for messaging services. Thus, the master database 420 can have a table of UMA authorized APs. The AAA server 416 can query the ACD 426 table via query logic (QL) 428 to process the authorized AP and identities. As illustrated, the QL 428 can be located external to the AAA server 416, or optionally, internal to the AAA server 416.

In one implementation, a functionality called USSD can be employed to transmit the unique AP data via the MCD (or cell phone) to the authorization subsystem of the cellular network. USSD is a GSM communications technology that is used to send text between a mobile phone and an application program in the network. Applications can include prepaid roaming or mobile chatting, for example. USSD is a capability built into a GSM standard for support of transmitting information over the signaling channels of the GSM network. USSD provides session-based communication, enabling a variety of applications.

In operation, USSD is used to send text between the user and an application. USSD can be thought of as a trigger, rather than an application itself. However, USSD enables other applications such as prepaid. In operation, it is not possible to bill for USSD directly, but instead bill for the application associated with the use of USSD such as circuit-switched data, SMS, or prepaid. The primary benefit of USSD is that it allows for very fast communications between the user and an application. Most of the applications enabled by USSD are menu based and include services such as mobile prepay and chat.

USSD is similar to Short Messaging Service (SMS), but, unlike SMS, USSD transactions occur during the session only. With SMS, messages can be sent to a mobile phone and stored for several days if the phone is not activated or within range. The wireless application protocol (WAP) supports USSD. USSD is defined in the GSM standard documents GSM 02.90 (USSD Stage 1) and GSM 03.90 (USSD Stage 2) the entireties of which are incorporated herein by reference.

The use of USSD code for invoking functionality in a cell phone is described in U.S. patent application Ser. No. 11/099,150 assigned to this assignee of this invention, and entitled "System and Method for Providing USSD-Like Features in a Wireless Network", the entirety of which is incorporated herein by reference.

USSD in its general sense, allows the user to enter freeform data. The USSD code with AP ID can be input manually; however, in another implementation, the AP ID is automatically inserted into the USSD code in the handset. Thus, the handset requires limited user knowledge in order to access the unique AP data (e.g., the BSSID).

USSD is a mechanism that works between the handset 402, the MSC 418 and HLR 424. Each of these entities (handset 402, MSC 418, and HLR 424) recognizes the USSD codes as special codes that allow a user to do special things. So, for example, on the cellular network today, USSD *646# can be used to cause functionality to receive SMS messages that tell the user how much airtime has been used so far this month. The USSD code is a specifically recognized code that the handset 402 recognizes. But fundamentally, USSD is any code string beginning with *, , or *, or #, or ##, or ###, or any combination of asterisks (*) and pound characters (#) up to three digits long, and with other codes, and which terminates with a # sign. The handset 402 recognizes this, and in combination with the MSC 418, instead of the USSD code initiating the dialing of a phone call, the code initiates the transfer of data.

Per the specification, data transfer can be by a preamble code of asterisks (*), for example. The preamble code is recognized, followed by a unique set of digits after the preamble (typically three digits), and then after the identifier digits, there is an attribute separator code of *. For example, *101*<parameter, like IMSI, or BSSID, or originating IP address, or anything>*<paramter2>* . . . For example, *IMSI*BSSID*>IP ADDRESS># is a USSD code. In a simple example, a customer understands the USSD coding mechanism, looks up the MAC address on the AP (the BSSID) and then enters parameters manually via the display and keypad of the cell phone, for example.

The USSD message is transmitted to the MSC 418, and the MSC 418 recognizes this unique code as a USSD code and it sends a very specific SS7 (signaling system 7) message. That SS7 message is transmitted to the HLR 424 where it is also recognized as a USSD message that is destined for a transitional database 430 (e.g., an SCP), which includes an SS7 interface. The transitional database 430 is a remote database that can be within the SS7 network. The transitional database 430 supplies the translation and routing needed in advanced network services. The transitional database 430 receives the USSD message and converts it for entry into its database. Thus, the transitional database 430 will look like a client to the master database 426 where all this information is stored, and will look like a SCP (signal control point) entity to the SS7 network. Thus, when the USSD code is pushed, it ends up in the transitional database 430.

The subject innovation also finds application in support of USSD-like technology in TDMA (time division multiple access) and/or CDMA networks. TDMA refers generally to a class of technologies including IS-54 and IS-136 where the networked transport is principally TIA-41/IS-41. CDMA refers generally to a class of technologies including CDMA2000, IS-95, and IS-2000 where a SS7 network transport is principally TIA-41/IS-41. Therefore, the USSD-like technology can be enabled via the use of an IS-41/SS7 communications language.

Figure 5:
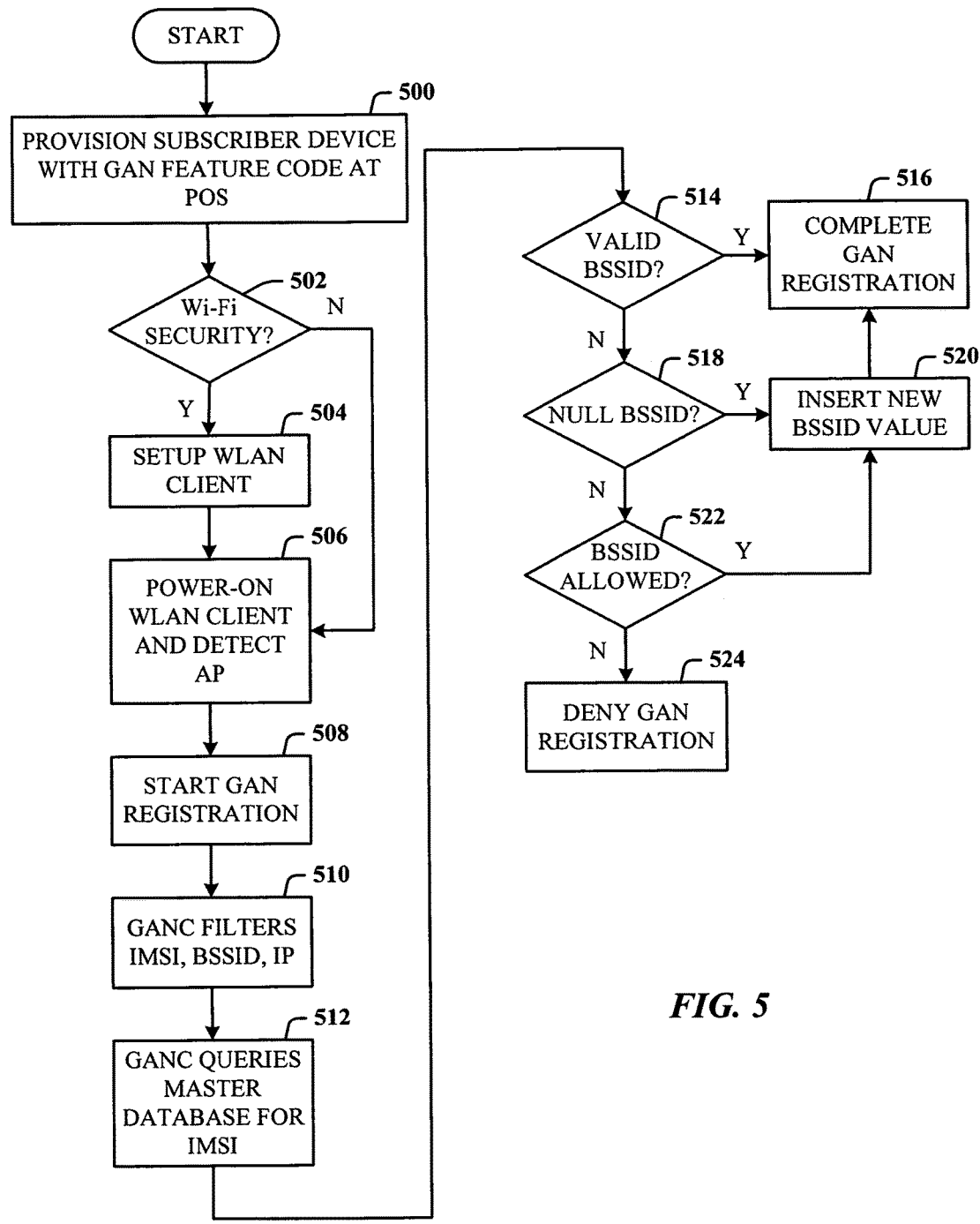
FIG. 5 illustrates a flow diagram for a methodology of provisioning a subscriber device in accordance with an innovative aspect.

FIG. 5 illustrates a flow diagram for a methodology of provisioning a subscriber device in accordance with an innovative aspect. At 500, the subscriber device is provisioned with a feature code at the retail point of sale. At 502, the system checks to see if there is Wi-Fi security. If yes, at 504, a WLAN client is setup. At 506, the WLAN client is powered up and the AP detected. At 508, GAN registration is initiated. At 510, the GANC filters the IMSI, BSSID and handset IP address. At 512, the GANC queries the master database for the IMSI. At 514, a check is made for a valid BSSID associated with the IMSI. If the BSSID is valid, flow is to 516 to complete GAN registration. If there is no valid BSSID, flow is from 514 to 518 to check for a null BSSID. If there is a null BSSID, flow is from 518 to 520 to insert a new BSSID values, and then to 516 to complete GAN registration. If there is no null BSSID, flow is from 518 to 522 to check if the BSSID is allowed. If yes, flow is to 502 to insert a new BSSID value, and then to 516 to complete the GAN registration. If the BSSID is not allowed, at 522, flow is to 524 to deny GAN registration. Back to 502, if there is no Wi-Fi security, flow is to 506, to power-on the WLAN client and detect the AP. Flow then progresses as before.

Figure 6:
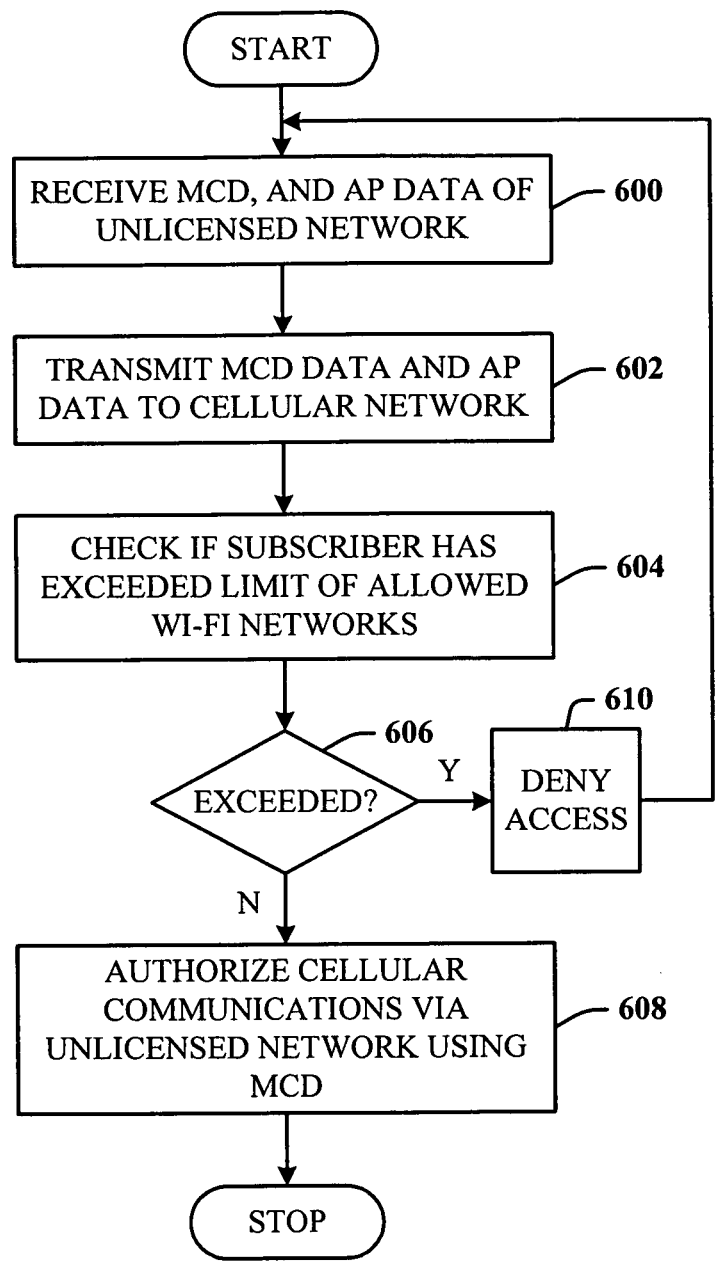
FIG. 6 illustrates a methodology of checking a handset registration against a maximum number of allowed handset/AP data pairings.

FIG. 6 illustrates a methodology of checking a handset registration against a maximum number of allowed handset/AP data pairings. At 600, the MCD is received, along with the unique data of the AP of the unlicensed network. At 602, the MCD data and AP data are transmitted to the cellular network. At 604, a check is made to determine if the subscriber has exceeded the limit of allowed Wi-Fi network APs. At 606, if the number has not been exceeded, flow is to 608 to allow cellular services via the unlicensed network using the MCD. However, if the number of MCD-AP associations has been exceeded, flow is from 606 to 610 to deny access, and then back to 600 to process the next pairing.

Figure 7:
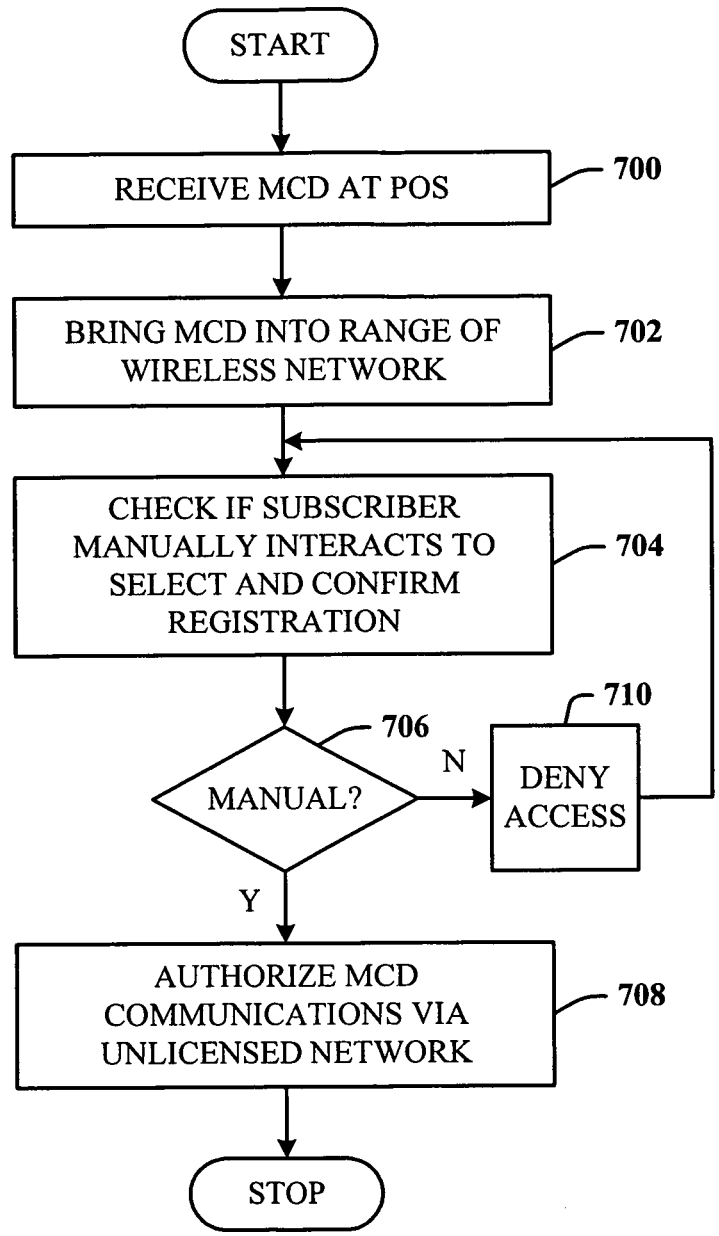
FIG. 7 illustrates a methodology of preventing rogue access during the registration process in accordance with a disclosed aspect.

Referring now to FIG. 7, there is illustrated a methodology of preventing rogue access during the registration process in accordance with a disclosed aspect. At 700, the MCD is received at the point of sale. At 702, the MCD is brought into range of an AP of an unlicensed network. At 704, a check is made to determine if the subscriber manually interacts to select and confirm, registration. At 706, if manual, flow is to 708 to authorize MCD communications to the cellular network via the unlicensed IP network. However, if there is no manual interaction detected, flow is from 706 to 710 to deny access. Flow can then be back to 704 to check again for subscriber interaction.

Figure 8:
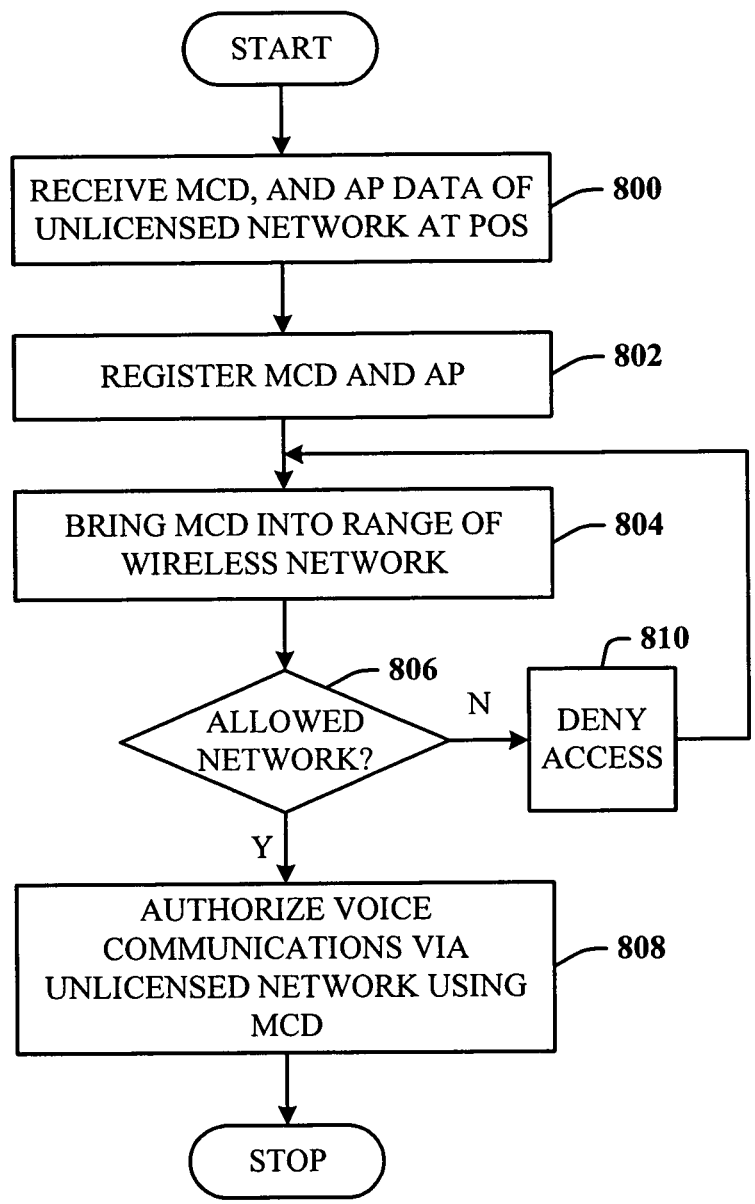
FIG. 8 illustrates an alternative methodology of preventing rogue access during the registration process in accordance with a disclosed aspect.

FIG. 8 illustrates an alternative methodology of preventing rogue access during the registration process in accordance with a disclosed aspect. At 800, the MCD is received, and the associated AP data of the unlicensed IP network is known at the point of sale. At 802, the MCD and AP pair is registered. At 804, the MCD is brought into radio range of an unlicensed IP network. At 806, the system checks to see if registration to the AP of this network is allowed. If yes, at 808, cellular communications over the unlicensed network to the cellular communications network is allowed. If not allowed, at 806, flow is to 810 to deny access, and flow can then be back to 804 to process the next registration when in radio range of a next unlicensed network.

As described in the following methodologies, the customer can change the allowed AP MAC address or add allowed AP MAC addresses for additional APs by calling customer care via an IVR (interactive voice recorder) system, direct voice interaction with a customer service representative, or making changes via a web interface.

Figure 9:
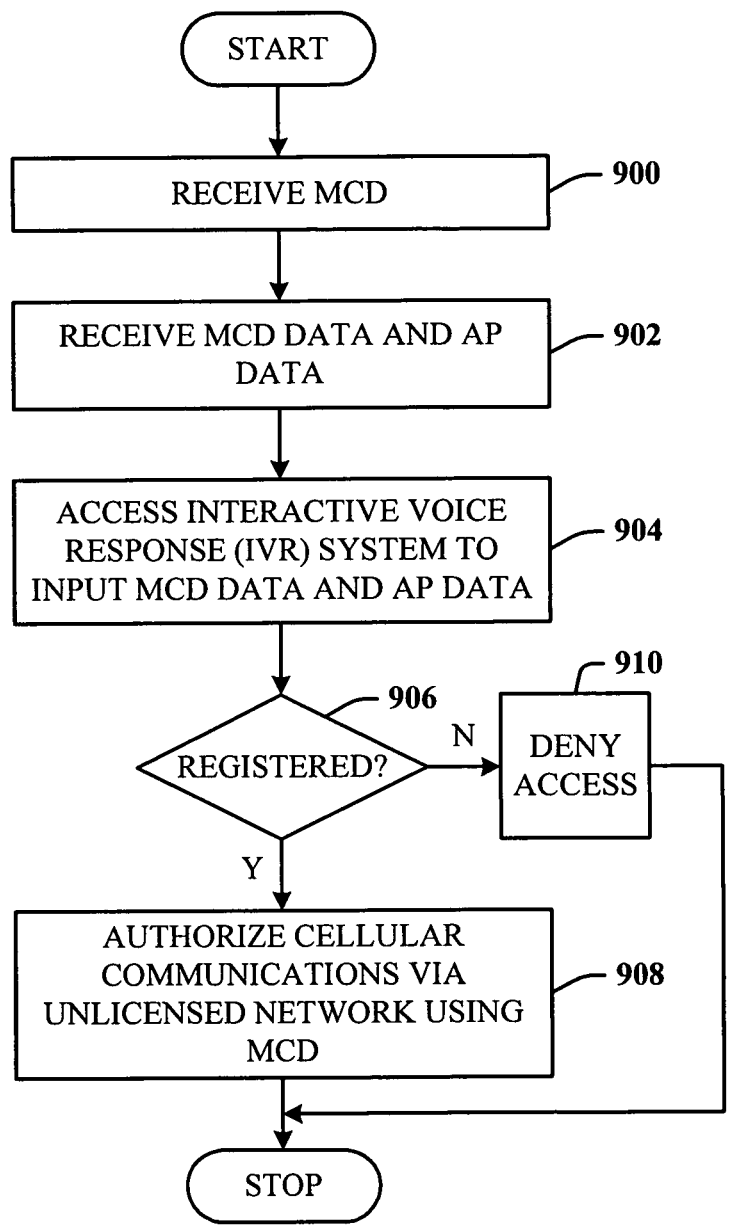
FIG. 9 illustrates an alternative methodology of registering via an interactive voice recorder in accordance with a disclosed aspect.

FIG. 9 illustrates an alternative methodology of registering via an IVR in accordance with a disclosed aspect. At 900, the MCD is received. At 902, the MCD data and unique AP data are received. That is, the user can determine the AP BSSID manually from the AP or the MCD automatically determines the BSSID of the AP and presents it to the user via the MCD display. It is to be appreciated that the BSSID need not have to be presented via the display to the user at all, but can also provide intuitive information that describes the BSSID data. For example, "the unique address of the AP has been discovered, please transmit" or "the unique address of the second AP has been discovered, please transmit". In any case, the handset subscriber can identify the Wi-Fi AP ESSID (extended service set identification or network name), the BSSID, RSSI (receive signal strength indicator), RF (radio frequency) band, data encryption, and RF channel. The ESSID is the name of a wireless LAN (WLAN).

All wireless devices on a WLAN must employ the same ESSID in order to communicate with each other. The handset client interface can include a minimal set of TCP/IP tools to view the handset's assigned IP address, run a traceroute, and ping the SEGW. Traceroute is a utility that shows the route over the network between two systems, listing all the intermediate routers a connection must pass through to get to its destination. It traces a packet from one computer to an Internet host, showing how many hops the packet requires to reach the host and how long each hop takes. For example, if a user visits a website and pages are appearing slowly, traceroute can be employed to determine where the longest delays are occurring. Ping is a utility used to determine whether a specific IP address is accessible, and works by sending a packet to the specified IP address and waiting for a reply.

At 904, the user accesses the IVR system to input the MCD and AP data. At 906, the system determines if the data can be registered. If so, at 908, cellular communications is authorized through the unlicensed network using the MCD. However, if during the registration process, the system determines that AP cannot be registered again at this time, flow is from 906 to 910 to deny access.

Figure 10:
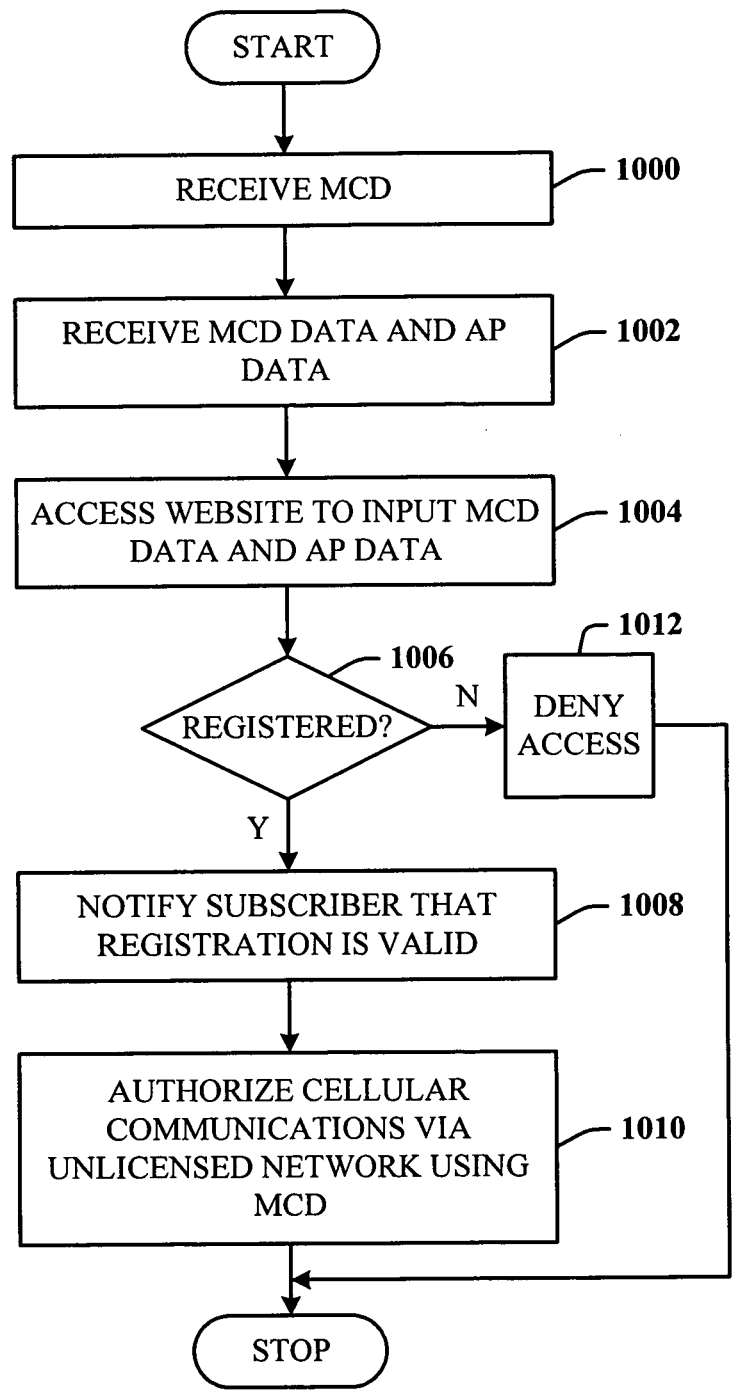
FIG. 10 illustrates an alternative methodology of registering via a website in accordance with a disclosed aspect.

FIG. 10 illustrates an alternative methodology of registering via a website in accordance with a disclosed aspect. At 1000, the MCD is received. At 1002, the MCD data and unique AP data are received, and according to any method described in FIG. 9 above. For example, the AP BSSID can be presented to the user via the display, along with the MCD data. At 1004, the user accesses a website to input the MCD and AP data. At 1006, the system determines if the data can be registered. If so, at 1008, the user can be notified via a website message and/or a message sent to the MCD that registration was successful. At 1010, communications is then authorized between the MCD and the cellular network via the unlicensed network. However, if during the registration process, the system determines that AP cannot be registered again at this time, flow is from 1006 to 1012 to deny access.

It is within contemplation of the subject invention that the MCD can communicate information to a personal computer (PC) using, for example, Bluetooth technology, infrared communications, a USB connection, any serial or parallel communications technology (e.g., IEEE 1394), or the like. Continuing with a Bluetooth example, the user accesses a website that facilitates user interaction for registering the MCD and AP data. In one instance, the user can select automatic data exchange, for example, whereby the MCD communicates the MCD and AP data via a Bluetooth connection to the PC, which is then transmitted to the website system, and therefrom to the cellular authorization subsystem for processing. In another example, the user utilizes SMS, MMS (multimedia message system), and/or IMS to complete the registration process. Accordingly, data input and notification is handled through the SMS, MMS, and IMS systems, respectively. It is also contemplated that the connection through which the subscriber MCD accesses the cellular network after successful registration is via Bluetooth technology. Accordingly, the user can utilize a Bluetooth wireless headset that communicates with the Bluetooth-capable MCD, and therefrom via Bluetooth to the AP and/or PC.

Figure 11:
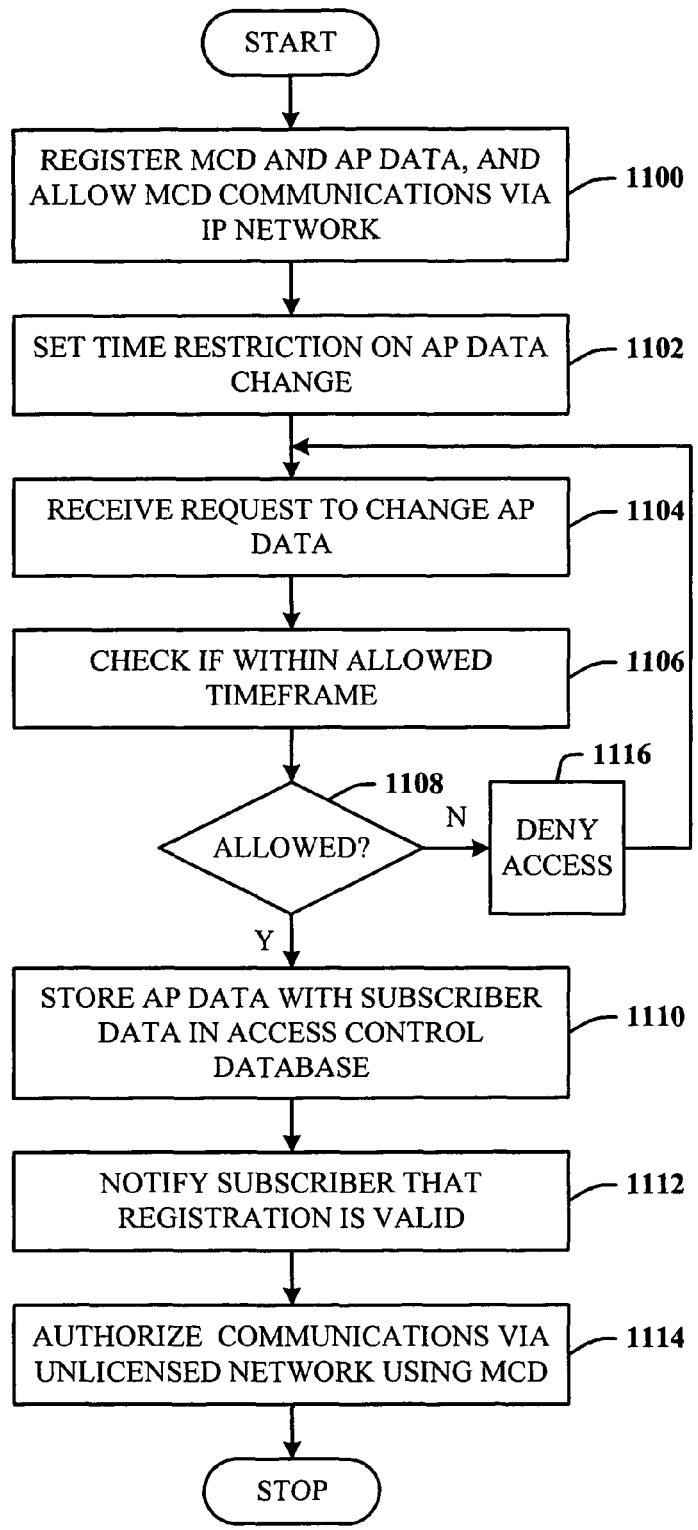
FIG. 11 illustrates a methodology of restricting changes between an MCD/AP pair in accordance with a disclosed aspect.

FIG. 11 illustrates a methodology of restricting changes between an MCD/AP pair in accordance with a disclosed aspect. At 1100, the MCD and AP are registered, and MCD communications is allowed through the unlicensed network. At 1102, a time restriction is set on how often an AP can be associated with a handset. For example, in one implementation, the customer would be allowed to change MAC addresses of the APs only once every 30-60 days to reduce the potential of arbitrage—the changing MAC IDs for new APs as the customer moves around town from one Wi-Fi hotspot to another hotspot. The dynamic database for MAC address information can allow for the time sensitivity restriction set by the service provider.

At 1104, a request to change the AP data is received. At 1106, the system determines if the request has been submitted within the allowed timeframe. If the request was submitted within the allowed timeframe, flow is from 1108 to 1110 to store the new AP data with the subscriber data in the ACD. At 1112, the subscriber can then be notified that registration of the new AP is valid and accepted. At 1114, communications is then authorized between the MCD and the cellular network via the unlicensed network. If, however, the request exceeded the number of change requests allowed in the specified timeframe, at 1108, the request is not allowed, and access is denied, as indicated at 1116. Flow can then proceed back to 1104 to process another request.

In another implementation, there are two timers: a first timer that ensures that a customer change request for re-associating an MCD with an AP can occur only after a 30-day period, and a second timer that ensures that the subscriber register three APs, for example within a predetermined time period (e.g., 48 hours). Thus, for a first use example, when the user arrives home from the point-of-sale for the first time, the user has 48 hours in which to associate the MCD with no more than three APs, and thereafter, cannot change any AP MAC address until at least 30 days has elapsed.

Figure 12:
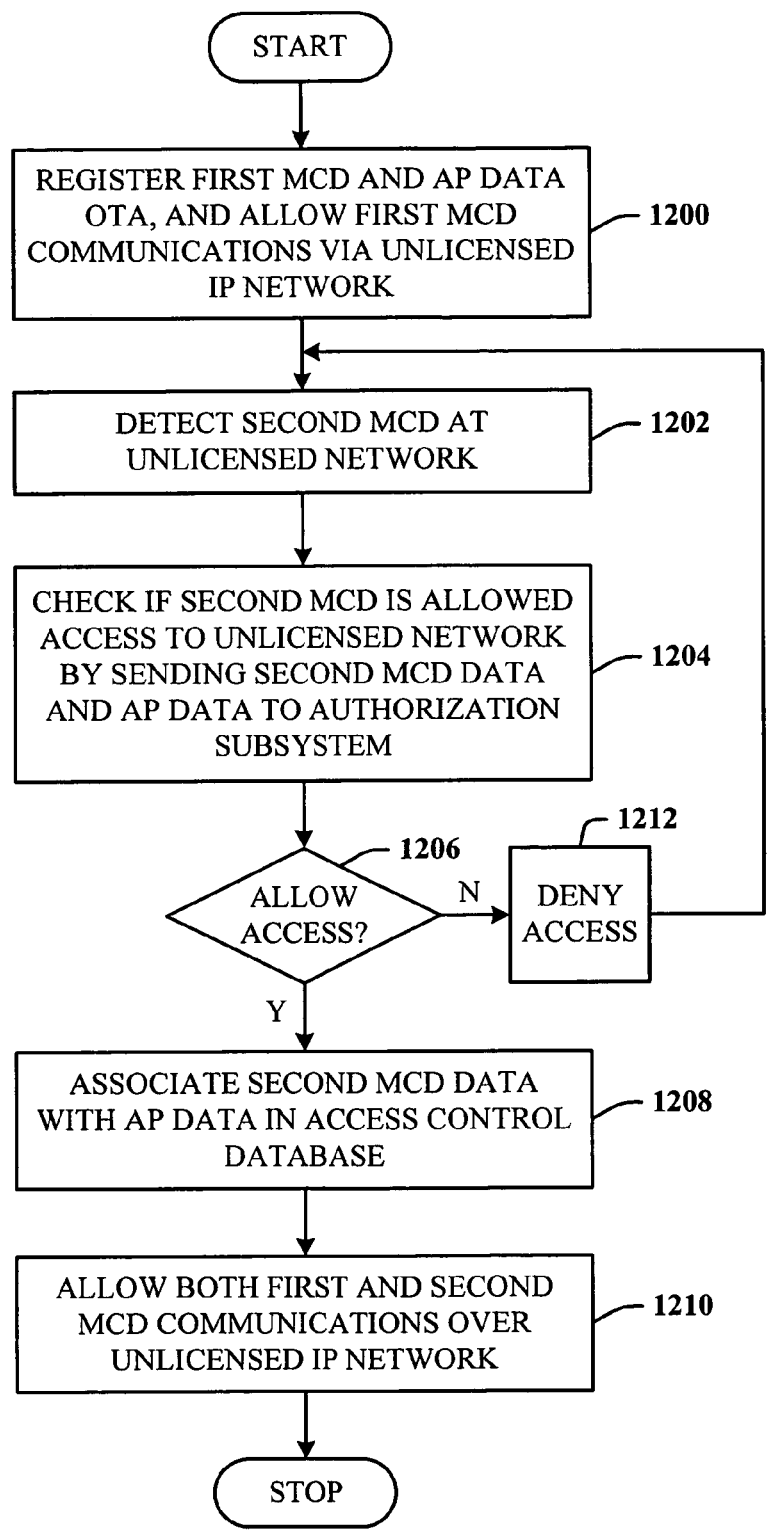
FIG. 12 illustrates a methodology of sharing access of a single AP between multiple MCDs for access to a cellular network through an unlicensed IP network according to another aspect.

FIG. 12 illustrates a methodology of sharing access of a single AP between multiple MCDs for access to a cellular network through an unlicensed IP network according to another aspect. At 1200, a first MCD and AP data of an AP are registered over the air, and the first MCD is allowed to communicate over the unlicensed IP network. At 1202, a second MCD is bought into radio range of the AP and detected. At 1204, the system can check if the second MCD is allowed under the subscriber service plan by sending second MCD data and AP data to the cellular authorization subsystem. For example, the subscriber can be operating under a family plan that allows several different MCDs to be associated with a single or multiple home or business APs. If, at 1206, the second MCD is allowed, flow is to 1208 to associate the second MCD data and AP data at the access control database. At 1210, both the first and second MCDs are then allowed to communicate over the cellular network via the unlicensed IP network. If, on the other hand, the second MCD is not allowed access, flow is from 1206 to 1212 to deny access, and then proceeds back to 1202 detect another MCD for multiple MCD plan processing.

In another exemplary illustration, credentials can be exchanged between MCDs by utilizing vCard (or Versitcard) technology. vCard is a term for an electronic business card. It is a means of personal data interchange (PDI) that automates the traditional business card. vCards can carry vital directory information such as name, addresses (business, home, mailing, parcel), telephone numbers (home, business, fax, pager, cellular, ISDN, voice, data, video), email addresses and Internet URLs (Universal Resource Locators). vCards can also carry graphics and multimedia including photographs, company logos, and audio clips such as for name pronunciation. Other features include the following: geographic and time zone information in vCards can be used to let others know when to make contact; vCards support multiple languages; the vCard specification is transport and operating system independent; and, vCards are Internet friendly, standards based, and have wide industry support.

Figure 13:
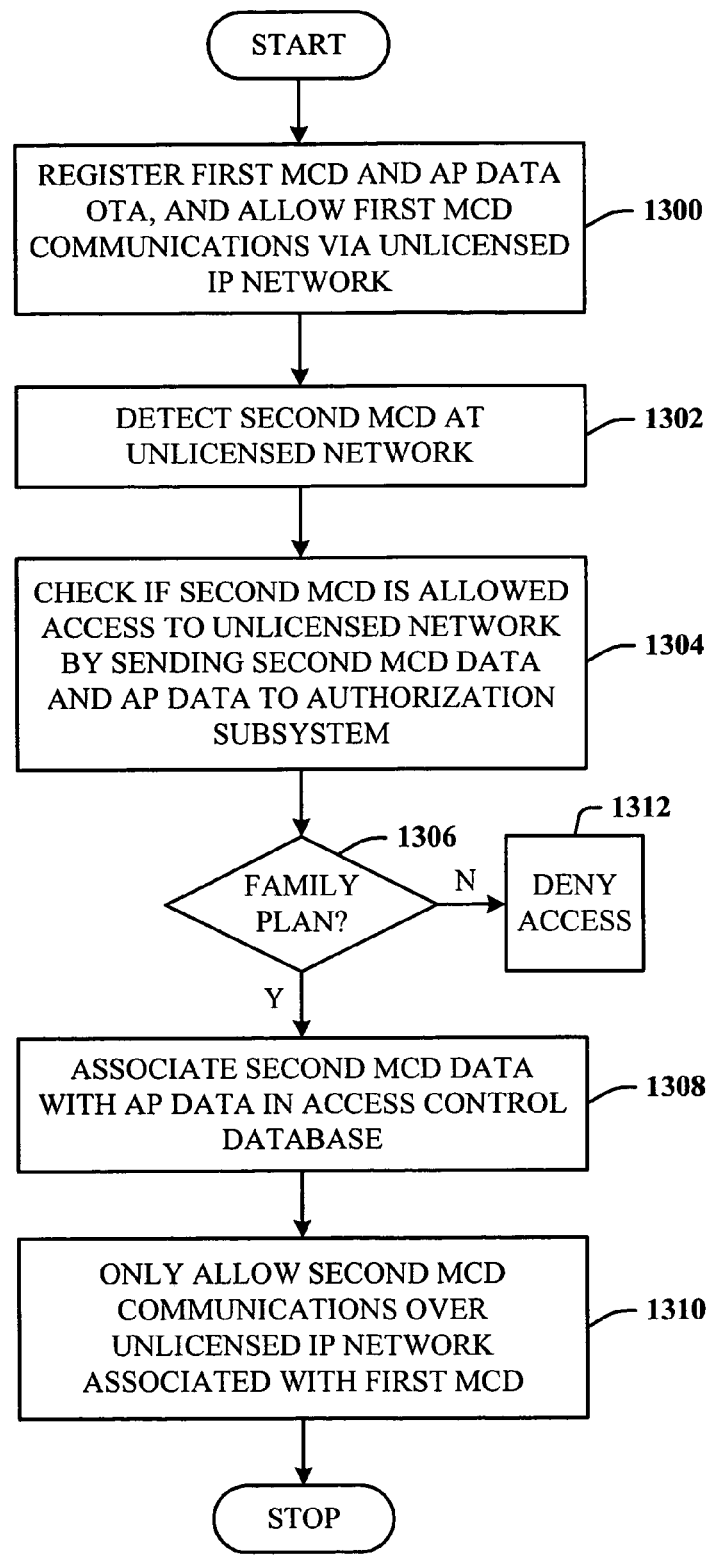
FIG. 13 illustrates a methodology of restricting multiple MCD access in accordance with another aspect.

FIG. 13 illustrates a methodology of restricting multiple MCD access in accordance with another aspect. At 1300, a first MCD and AP data of an AP are registered over the air, and the first MCD is allowed to communicate over the unlicensed IP network. At 1302, a second MCD is bought into radio range of the AP and detected. At 1304, the system can check if the second MCD is allowed under the subscriber service plan by sending second MCD data and AP data to the cellular authorization subsystem. For example, the subscriber can be operating under a family plan that allows several different MCDs to be associated with a single or multiple home or business APs. If, at 1306, the subscriber is operating on a family plan where multiple MCDs are allowed, but only up to a predetermined number of MCDs, and the second MCD is allowed, flow is to 1308 to associate the second MCD data and AP data at the access control database. At 1310, the second MCD is then allowed to communicate over the cellular network via only the unlicensed IP network that is associated with the first MCD. If, on the other hand, the second MCD is not allowed access, flow is from 1306 to 1312 to deny access. Thus, under one example of enforcing a family plan subscription, the MCDs associated with a family can communicate over only one unlicensed network, that being the home Wi-Fi network.

In another example, each family member is allowed to associate a given MCD with a predetermined number of APs, thus allowing more flexibility where multiple MCDs are present. For example, the wife can associate her cell phone with two unlicensed networks: a home network and a Wi-Fi network at her place of work. Similarly, the husband can register his cell phone with the home network and a Wi-Fi network as his place of work. However, limitations can be imposed such that these cell phones will only be allowed to use these unlicensed networks. As can be understood, the service provider can impose many different types of service plans and options based on a particular user scenario.

Figure 14:
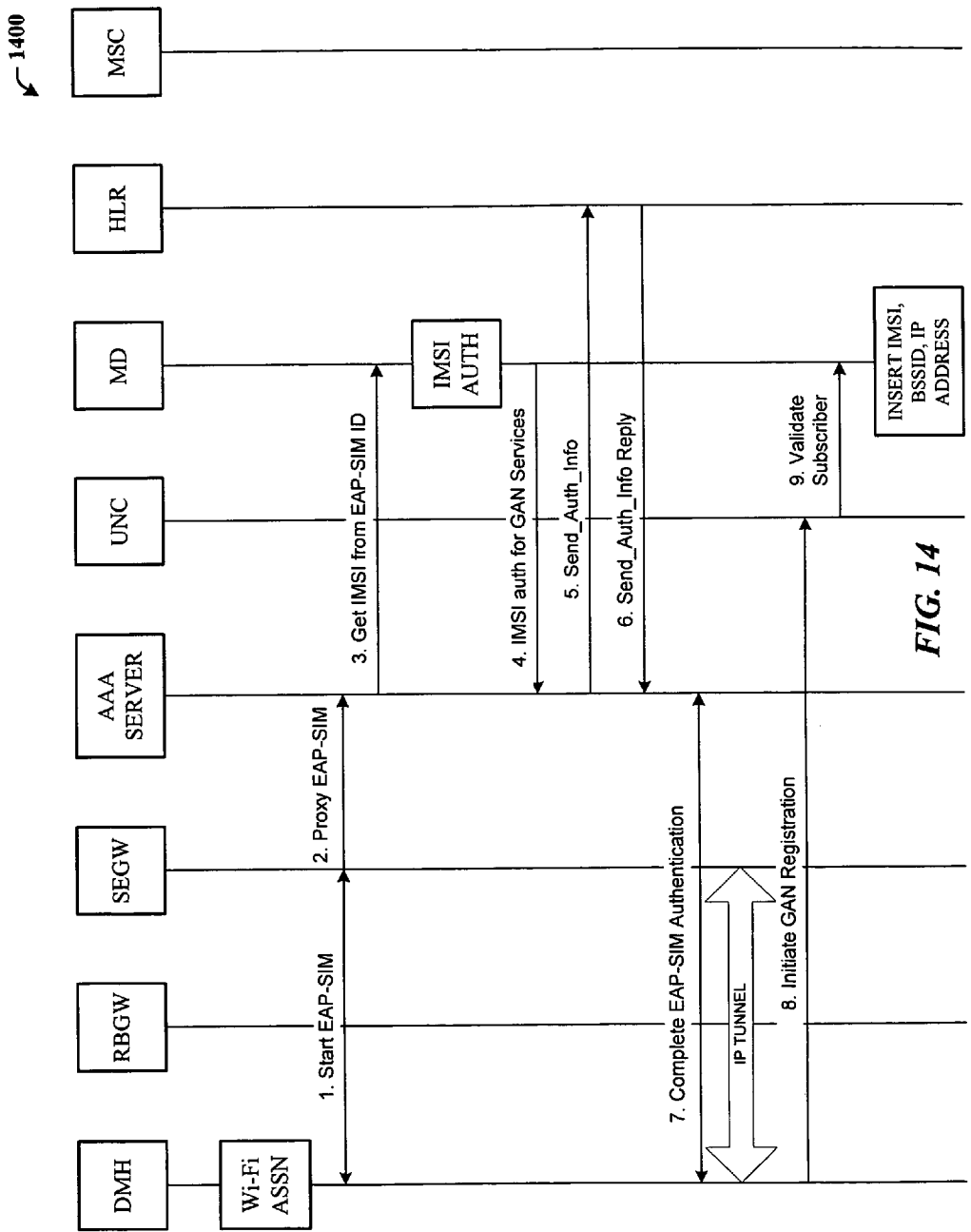
FIG. 14 illustrates a message-flow diagram for successful automatic network provisioning according to an aspect.

FIG. 14 illustrates a message-flow diagram 1400 for successful automatic network provisioning according to an aspect. In this example diagram, the handset is a dual-mode handset (DMH) that initially associates with a home Wi-Fi network. At 1, an EAP-SIM message is sent from the handset to the SEGW. At 2, a proxy EAP-SIM message is sent from the SEGW to the AAA server. The AAA server extracts the IMSI from the EAP-SIM ID and forwards the IMSI to the master database (MD) for authorization. Once authorized, the MD replies to the AAA server with IMSI authorization for GAN services. The AAA server then transmits a Send_Auth_Info request to the HLR, and the HLR responds with a Send_Auth_Info Reply to the AAA server. The AAA server then transmits the authorization information to the handset to complete the EAP-SIM authentication process. An IP tunnel has now been created between the handset and the SEGW. The handset then initiates GAN registration to the UNC. The UNC communicates with the MD to validate the subscriber, and the associated IMSI, BSSID (AP data), and cell phone IP address are entered into the MD.

Figure 15:
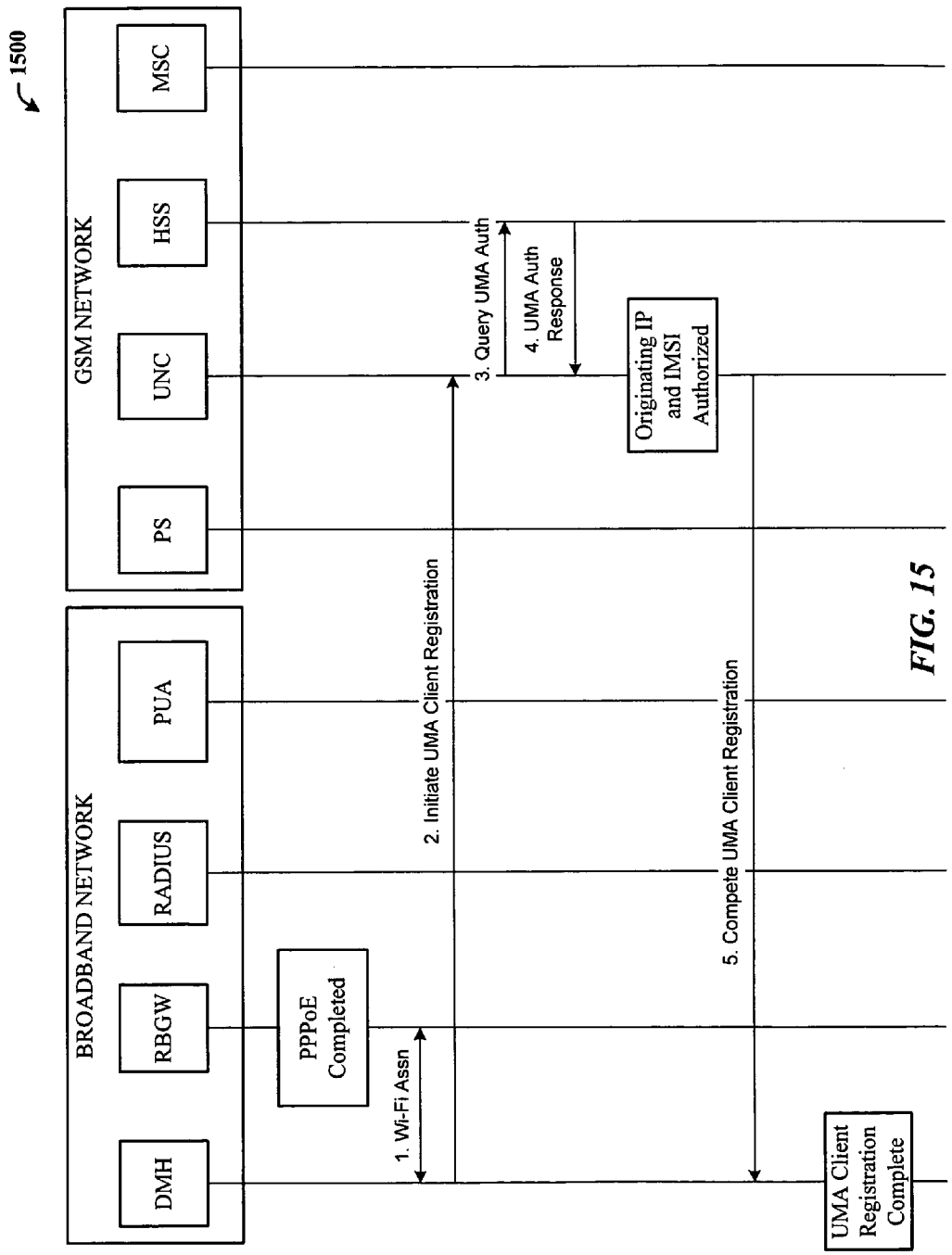
FIG. 15 illustrates a message-flow diagram between a broadband network and a GSM network according to an aspect.

FIG. 15 illustrates a message-flow diagram 1500 between a broadband network and a GSM network according to an aspect. A radio band gateway (RGBW) of the broadband network sets up for PPPoE (Point-to-Point Protocol over Ethernet). PPPoE is a specification for connecting the users on Ethernet network to the Internet through a common broadband medium, such as a single DSL line, wireless device, or cable modem. All the users over the Ethernet share a common connection, so the Ethernet principles supporting multiple users in a LAN combine with the principles of PPP, which apply to serial connections. The handset performs Wi-Fi association with the RGBW. Thereafter, the handset initiates UMA client registration to the UNC. The UNC then queries an HSS for UMA authorization. The HSS sends a UMA authorization response back to the UNC. If successful, the originating IP of the handset and the IMSI are authorized in the UNC. The UNC completes the UMA authorization process back to the handset. UMA client registration in the handset is now complete. As illustrated, the broadband network also includes a RADIUS (remote authentication dial-in user service) server and a PUA (presence user agent) entity. The RADIUS server is an authentication and accounting system used by many Internet service providers (ISPs). When the subscriber dials in to the ISP, he or she must enter a username and a password. This information is passed to a RADIUS server, which checks that the information is correct, and then authorizes access to the ISP system.

Presence is defined as the willingness and ability of a user to communicate with other users on a network. A PUA manipulates presence information for a presence entity (or presentity). Multiple PUAs can be allowed per presentity, meaning that a user can have many devices (such as a cell phone and Personal Digital Assistant (PDA)), each of which is independently generating a component of the overall presence information for a presentity. The cellular network includes a presence server (PS) that processes presence agent messages. The cellular network also includes the MSC for related functionality.

In summary of some of the novel aspects described herein, a service provider can allow Wi-Fi configuration data to be updated only over the air (OTA). OTA may be used by subscribers to share Wi-Fi configuration data. For example, one subscriber can send their Wi-Fi configuration data to another subscriber who desires to use the same access point and data encryption keys.

Additionally, the service provider can implement an IVR system, a web interface, SMS, MMS, IMS, and a handset interface, for example, to automate subscriber change requests to authorize new access points.

In one implementation, individual customers can be restricted to roaming on only 1-3 distinct access points. Moreover, access point restriction can be limited to private access points, not public (or hot spot) access points. Access point restriction can be limited to access points at the primary residence of the subscriber, and not enterprise access points, which can be achieved, if desired, by registering last cell ID roamed or identified as home serving cell ID. Subscribers can be prevented from accessing a non-UMA profile for data roaming on the Wi-Fi network. This can be made be a requirement of the handset.

Available information for registration in UMA standards can include the access point ID (or BSSID), the originating IP address assigned to the cell phone and the IMSI. The BSSID can be cloned, and the IP address can be dynamic.

Figure 16:
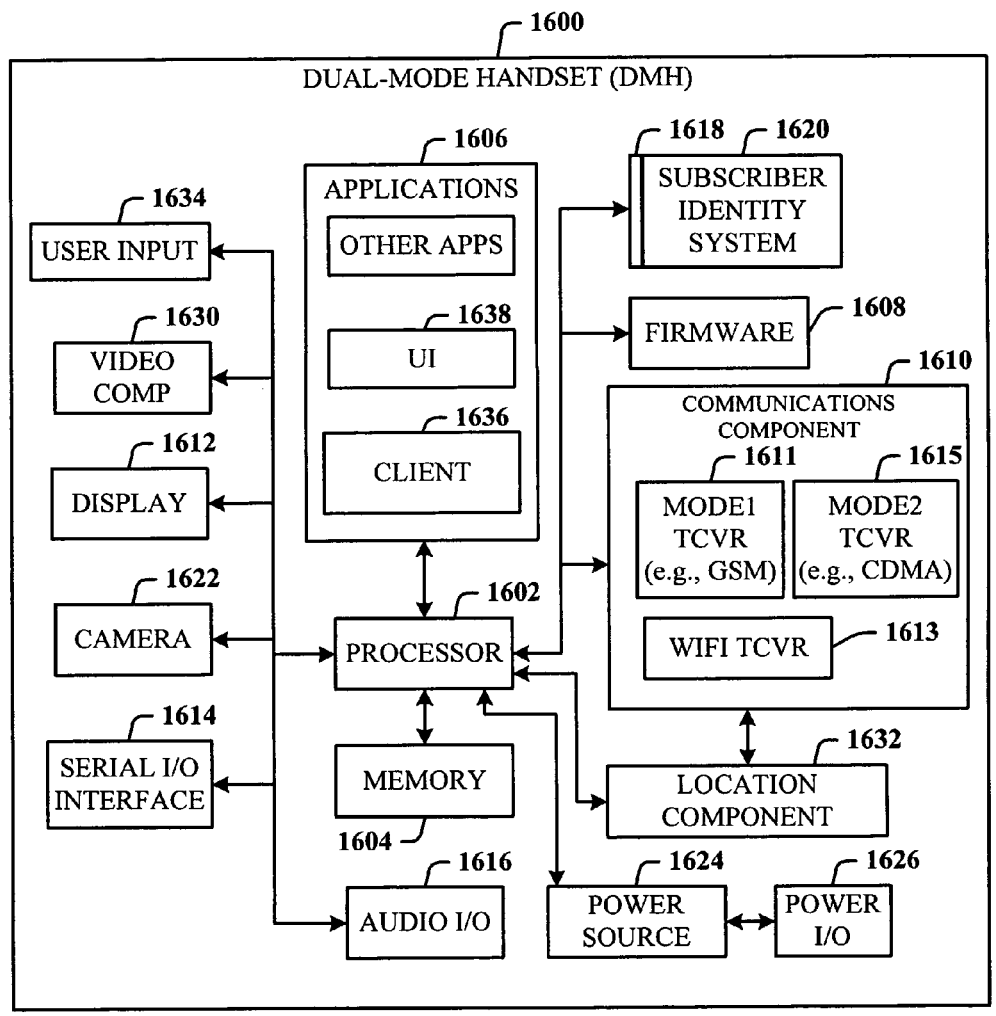
FIG. 16 illustrates a schematic block diagram of an exemplary dual mode handset in accordance with an innovative aspect.

FIG. 16 illustrates a schematic block diagram of an exemplary dual mode handset 1600 in accordance with an innovative aspect. In order to provide additional context for various aspects thereof, FIG. 16 and the following discussion are intended to provide a brief, general description of a suitable environment 1600 in which the various aspects of the innovation can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1600 includes a processor 1602 for controlling and processing all onboard operations and functions. A memory 1604 interfaces to the processor 1602 for storage of data and one or more applications 1606 (e.g., a video player software, user feedback component software, etc.). Other applications can include voice recognition of predetermined voice commands that facilitate initiation of the user feedback signal, as well as those described infra. The applications 1606 can be stored in the memory 1604 and/or in a firmware 1608, and executed by the processor 1602 from either or both the memory 1604 or/and the firmware 1608. The firmware 1608 can also store startup code for execution in initializing the handset 1600. A communications component 1610 interfaces to the processor 1602 to facilitate wired/wireless communication with external systems, for example, cellular networks, VoIP networks, and so on. Here, the communications component 1610 can also include a first suitable cellular transceiver 1611 (e.g., a GSM transceiver) as one mode, and an unlicensed transceiver 1613 (e.g., Wi-Fi) for corresponding signal communications, and a second cellular transceiver 1615 (e.g., a CDMA transceiver) for a second mode. The handset 1600 can be a device such as a cellular telephone, a PDA with mobile communications capabilities, and messaging-centric devices. The communications component 1610 can also facilitate communications reception from terrestrial radio networks (e.g., broadcast), digital satellite radio networks, and Internet-based radio services networks.

The handset 1600 includes a display 1612 for displaying text, images, video, telephony functions (e.g., a Caller ID function), setup functions, and for user input. The display 1612 can also accommodate the presentation of multimedia content (e.g., music metadata, messages, wallpaper, graphics, . . . ). A serial I/O interface 1614 is provided in communication with the processor 1602 to facilitate wired and/or wireless serial communications (e.g., USB, and/or IEEE 1394) via a hardwire connection, and other serial input devices (e.g., a keyboard, keypad, and mouse). This supports updating and troubleshooting the handset 1600, for example. Audio capabilities are provided with an audio I/O component 1616, which can include a speaker for the output of audio signals related to, for example, indication that the user pressed the proper key or key combination to initiate the user feedback signal. The audio I/O component 1616 also facilitates the input of audio signals via a microphone to record data and/or telephony voice data, and for inputting voice signals for telephone conversations.

The handset 1600 can include a slot interface 1618 for accommodating a subscriber identity system 1620 that can accommodate a SIM or universal SIM (USIM), and interfacing the subscriber identity system 1620 with the processor 1602. However, it is to be appreciated that the subscriber identity system 1620 can be manufactured into the handset 1600, and updated by downloading data and software thereinto.

The handset 1600 can process IP data traffic via the communication component 1610 to accommodate IP traffic from an IP network such as, for example, the Internet, a corporate intranet, a home broadband network, a person area network, etc., via an ISP or broadband cable provider. Thus, VoIP traffic can be utilized by the handset 1600 and IP-based multimedia content can be received in either an encoded or decoded format.

An image capture and processing component 1622 (e.g., a camera) can be provided for decoding encoded multimedia content. The handset 1600 also includes a power source 1624 in the form of batteries and/or an AC power subsystem, which power source 1624 can interface to an external power system or charging equipment (not shown) via a power I/O component 1626.

The handset 1600 can also include a video component 1630 for processing video content received and, for recording and transmitting video content. A location tracking component 1632 facilitates geographically locating the handset 1600 (e.g., GPS-global positioning system). A user input component 1634 facilitates the user input via conventional input device technologies such as a keypad, keyboard, mouse, stylus pen, touch screen and voice activation, for example.

Referring again to the applications 1606, a client 1636 can be provided that facilitates AP detection, BSSID extraction and transmission of the handset and AP data to the cellular network for authorization. The applications 1606 can also include a user interface application 1638 that operates with the client 1636 to present the handset and AP data, and that facilitates at least the capability of discovery, play and store of multimedia content, for example, music.

The handset 1600, as indicated supra related to the communications component 1610, includes an indoor network radio transceiver 1613 (e.g., WiFi transceiver). This function supports the indoor radio link, such as IEEE 802.11, for the dual-mode GSM handset 1600. The handset 1600 can also accommodate at least satellite radio services through a handset that can combine wireless voice and digital radio chipsets into a single handheld device. It is to be understood that although the handset 1600 is illustrated as including a GSM mode, modes other than GSM can be accommodated, as indicated supra.

Figure 17:
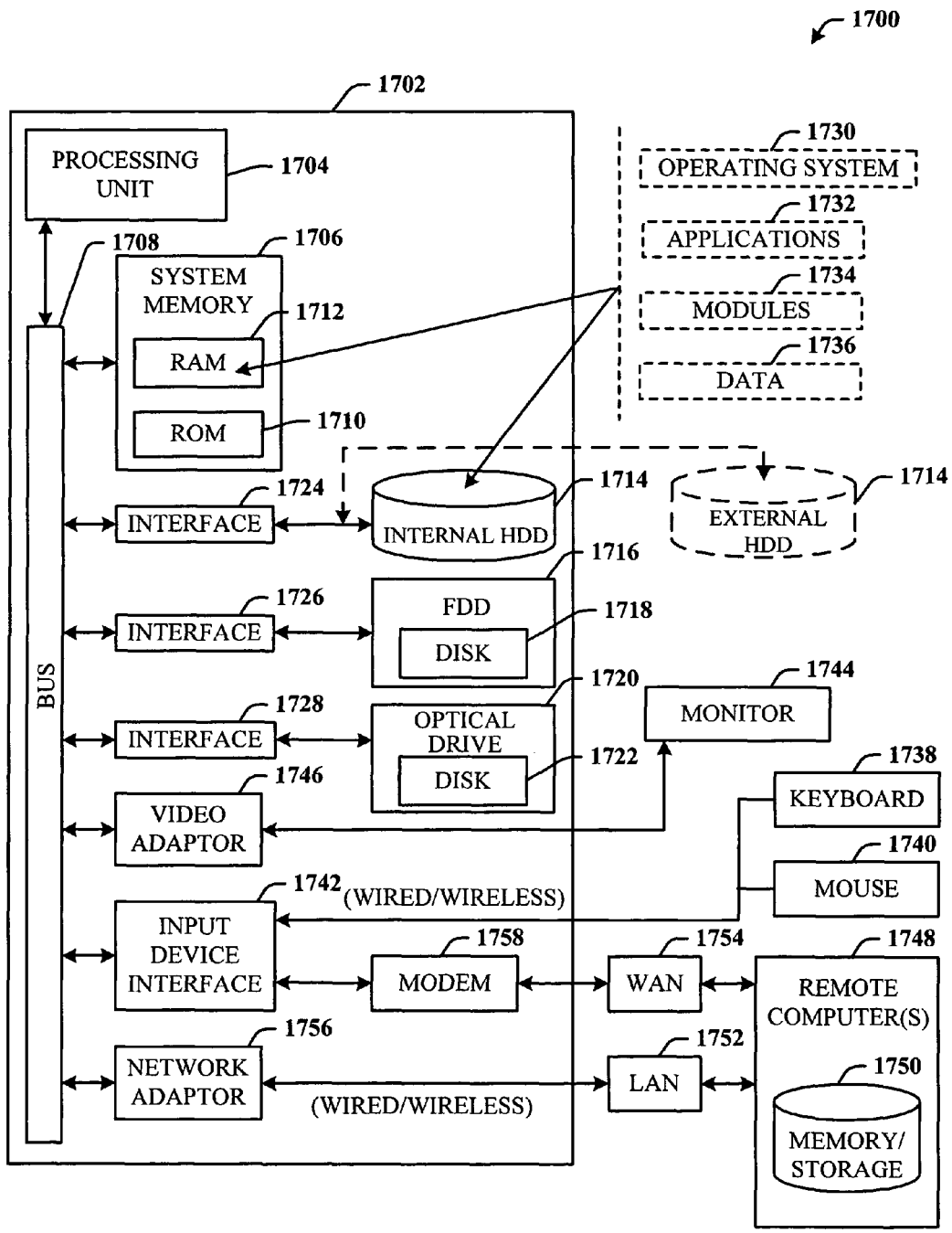
FIG. 17 illustrates a block diagram of a computer operable to store and process the disclosed access control database and/or AAA server query logic architectures.

Referring now to FIG. 17, there is illustrated a block diagram of a computer operable to store and process the disclosed access control database and/or AAA query logic architectures. In order to provide additional context for various aspects thereof, FIG. 17 and the following discussion are intended to provide a brief, general description of a suitable computing environment 1700 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 17, the exemplary environment 1700 for implementing various aspects includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures may also be employed as the processing unit 1704.

The system bus 1708 can be any of several types of bus structure that may further interconnect to a memory bus (with or without a memory controller), a peripheral bus, and a local bus using any of a variety of commercially available bus architectures. The system memory 1706 includes read-only memory (ROM) 1710 and random access memory (RAM) 1712. A basic input/output system (BIOS) is stored in a non-volatile memory 1710 such as ROM, EPROM, EEPROM, which BIOS contains the basic routines that help to transfer information between elements within the computer 1702, such as during start-up. The RAM 1712 can also include a high-speed RAM such as static RAM for caching data.

The computer 1702 further includes an internal hard disk drive (HDD) 1714 (e.g., EIDE, SATA), which internal hard disk drive 1714 may also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is to be appreciated that the innovation can be implemented with various commercially available operating systems or combinations of operating systems.

A user can enter commands and information into the computer 1702 through one or more wired/wireless input devices, e.g., a keyboard 1738 and a pointing device, such as a mouse 1740. Other input devices (not shown) may include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 1394 serial port, a game port, a USB port, an IR interface, etc.

A monitor 1744 or other type of display device is also connected to the system bus 1708 via an interface, such as a video adaptor 1746. In addition to the monitor 1744, a computer typically includes other peripheral output devices (not shown), such as speakers, printers, etc.

The computer 1702 may operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which may connect to a global communications network, e.g., the Internet.

When used in a LAN networking environment, the computer 1702 is connected to the local network 1752 through a wired and/or wireless communication network interface or adaptor 1756. The adaptor 1756 may facilitate wired or wireless communication to the LAN 1752, which may also include a wireless access point disposed thereon for communicating with the wireless adaptor 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 via the serial port interface 1742. In a networked environment, program modules depicted relative to the computer 1702, or portions thereof, can be stored in the remote memory/storage device 1750. It will be appreciated that the network connections shown are exemplary and other means of establishing a communications link between the computers can be used.

The computer 1702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 18:
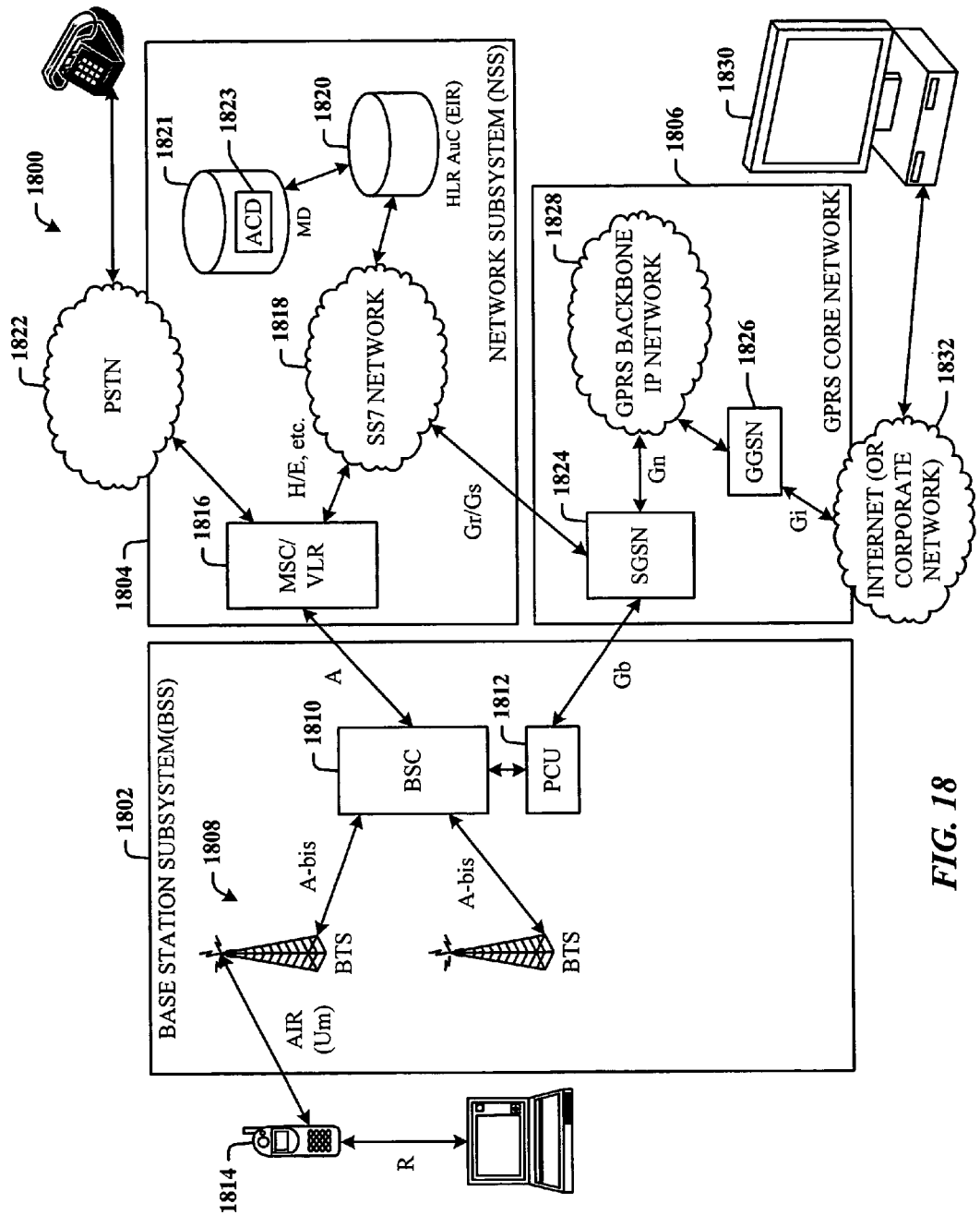
FIG. 18 illustrates an exemplary GSM network that facilitates DMS access control, location-based billing, and E911 mechanisms according to an innovative aspect.

FIG. 18 illustrates an exemplary GSM network 1800 that facilitates DMS access control, location-based billing, and E911 mechanisms according to an innovative aspect. The GSM system, designed as a 2G cellular communications system, utilizes TDMA technology to enable greater call capacity. Digitally-encoded speech can also be ciphered to retain call privacy. Voice calls are the primary function of the GSM system. To achieve this, the speech is digitally encoded, and later decoded using a vocoder.

GSM also supports a variety of other data services, although the performance for such data services (e.g., facsimile videotext and teletext) is slow. One data service includes SMS that allows bi-directional messaging, store-and-forward delivery, and alphanumeric messages. The overall system definition for GSM describes not only the air interface, but also the network. GSM uses 200 KHz RF channels, and are typically multiplexed to, for example, enable eight users to access each carrier.

The GSM network 1800 includes a base station subsystem (BSS) 1802, a network subsystem (NSS) 1804 and a GPRS core network 1806. The BSS 1802 can include one or more base transceiver stations (BTS) 1808 and a base station controller (BSC) 1810 connected together on an A-bis interface. The BTS and accompanying base stations (not shown) connect a cell phone to a cellular network. Base stations are all interconnected to facilitate roaming from one cell to another via a process called handover, without losing the cell connection.

A packet control unit (PCU) 1812 is shown connected to the BSC 1810 although the exact position of this can depend on the vendor architecture. The BSS 1802 is connected by the air interface Um to a mobile terminal 1814. The BTS 1808 are the actual transmitters and receivers of radio signals. Typically, a BTS for anything other than a picocell will have several different transceivers (TRXs) which allow it to serve several different frequencies or even several different cells (in the case of sectorized base stations).

By using directional antennae on a base station, each pointing in different directions, it is possible to sectorize the base station so that several different cells are served from the same location. This increases the traffic capacity of the base station (each frequency can carry eight voice channels) while not greatly increasing the interference caused to neighboring cells (in any given direction, only a small number of frequencies are being broadcast).

The BSC 1810 provides the intelligence behind the BTS 1808. Typically, a BSC 1810 can have tens or even hundreds of BTSs 1808 under its control. The BSC 1810 handles allocation of radio channels, receives measurements from the mobile phones, and controls handovers from BTS to BTS (except in the case of an inter-MSC handover in which case control is in part the responsibility of an MSC). One function of the BSC 1810 is to act as a concentrator such that many different low capacity connections to the BTS 1808 can become reduced to a smaller number of connections towards the MSC. Generally, this means that networks are often structured to have many BSCs 1810 distributed into regions near the BTS 1808 which are then connected to large centralized MSC sites.

The PCU 1812 can perform some of the equivalent tasks of the BSC 1810. The allocation of channels between voice and data can be controlled by the base station, but once a channel is allocated to the PCU 1812, the PCU 1812 takes full control over that channel. The PCU 1812 can be built into the base station, built into the BSC, or even in some architectures, it can be at an SGSN site.

The BSS 1802 connects to the NSS 1804 by an A interface. The NSS 1804 is shown containing an MSC 1816 connected via an SS7 network 1818 to an HLR 1820. The AuC and the EIR, although technically separate functions from the HLR 1820, are shown together since combining them can be performed in the network. The HLR 1820 can interface to a master database (MD) 1821 that further includes an ACD 1823 of at least pair data (e.g., BSSID and handset IP address, and IMSI data).

The combination of a cell phone 1814 and a SIM card (not shown) creates a special digital "signature" that includes a subscriber number which is sent from the cell phone 1814 to the nearest BTS 1808 asking that the subscriber of a particular network be allowed to use the network. The request is passed on along the network of BTS 1808 to the heart of a cellular network, the MSC 1816. The MSC 1816 also routes all incoming and outgoing calls to and from the fixed-line networks or other cellular networks. When the user wants to make an outgoing call, another section of the MSC 1816 called the VLR checks whether the caller is actually allowed to make that call. For example, if the caller is barred for international dialing, a message to that effect will be generated by the VLR, sent along the network, and almost instantly back to the cell phone.

The MSC 1816 also contains the component called HLR 1820 that provides the administrative information required to authenticate, register and locate the caller as that network's subscriber. Once the HLR 1820 has received a log-on request, the HLR 1820 immediately checks the special "signature" contained in the request against the HLR special subscriber database. If the subscription is current, the MSC 1816 sends a message back to the phone 1814 via the network of BTS 1808 that indicates the caller is allowed to access the network. The name or code of that network will appear on the LCD screen of the cell phone 1814. Once this network "name" message appears on the phone 1814 LCD screen, it means the caller is connected to the network and able to make and receive calls.

The HLR 1820 registers which base station the cell phone 1814 is currently connected to, so that when the network MSC 1816 needs to route an incoming call to the cell phone number, it will first check the HLR 1820 to see where the cell phone 1814 is located. Periodically, the cell phone 1814 will send a message to the network indicating where it is, in a process called polling. The combination of the tracking function and the caller's unique digital signature allows the MSC 1816 to route that call to the precise base station the cell phone happens to be connected to, and then exclusively to the cell phone, even if a number of other subscribers are simultaneously connected to that base station.

When traveling to another cell while driving, for example, the HLR 1820 is automatically updated, and continues to monitor where exactly it should route the calls should the caller then move within range of another base station. This routing procedure means that out of hundreds of thousands of subscribers, only the correct cell phone will ring when necessary.

The NSS 1804 has a direct connection to the PSTN 1822 from the MSC 1816. There is also a connection from the NSS 1804 to the GPRS core network 1806 via a Gr/Gs interface although this is optional and not always implemented. The illustrated GPRS Core Network 1806 is simplified to include a SGSN 1824 (connected to the BSS 1802 by the Gb interface) and a GGSN 1826. The SGSN 1824 and the GGSN 1826 are connected together by a private IP network 1828 called a GPRS backbone shown as the Gn reference point. A computer 1830 is depicted as connecting to the core network 1806 via an Internet or corporate network 1832.

Some voice mail systems are linked to a network SMS Center (SMSC), a special facility that handles short messages. The SMSC generates the special SMS message that notifies the caller when they have mail waiting in a Mailbox. SMS messages can be received on an SMS-capable cell phone even while the caller is on a voice call. This is because the SMS messages are sent on a different radio frequency, the GSM data channel, than voice calls, so that the two never interfere.

Figure 19:
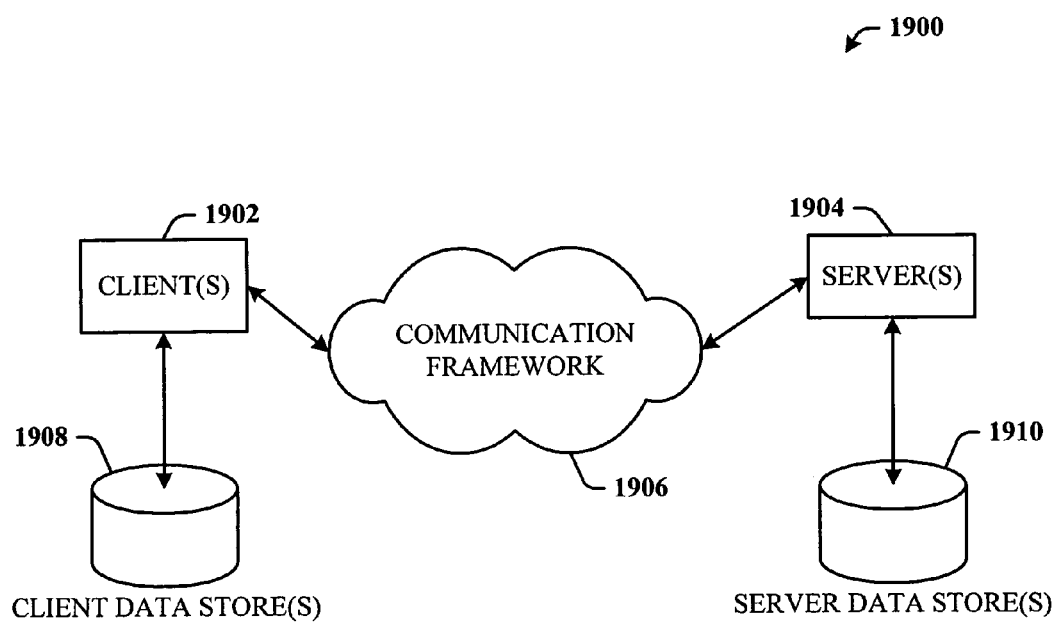
FIG. 19 illustrates a schematic block diagram of an exemplary computing environment that facilitates client/server functions in accordance with another aspect.

Referring now to FIG. 19, there is illustrated a schematic block diagram of an exemplary computing environment 1900 that facilitates client/server functions in accordance with another aspect. The system 1900 includes one or more client(s) 1902. The client(s) 1902 can be hardware and/or software (e.g., threads, processes, computing devices). The client(s) 1902 can house cookie(s) and/or associated contextual information by employing the subject innovation, for example.

The system 1900 also includes one or more server(s) 1904. The server(s) 1904 can also be hardware and/or software (e.g., threads, processes, computing devices). The servers 1904 can house threads to perform transformations by employing the invention, for example. One possible communication between a client 1902 and a server 1904 can be in the form of a data packet adapted to be transmitted between two or more computer processes. The data packet may include a cookie and/or associated contextual information, for example. The system 1900 includes a communication framework 1906 (e.g., a global communication network such as the Internet) that can be employed to facilitate communications between the client(s) 1902 and the server(s) 1904.

Communications can be facilitated via a wired (including optical fiber) and/or wireless technology. The client(s) 1902 are operatively connected to one or more client data store(s) 1908 that can be employed to store information local to the client(s) 1902 (e.g., cookie(s) and/or associated contextual information). Similarly, the server(s) 1904 are operatively connected to one or more server data store(s) 1910 that can be employed to store information local to the servers 1904.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
    a processor; and
    a non-transitory computer-readable storage device comprising computer-executable instructions that, when executed by the processor, cause the processor to perform operations comprising:
        receiving, from a mobile communications device through a mobile communications network, access point data and mobile communications device data, wherein the access point data is received, via an unlicensed network, by the mobile communications device from an access point associated with an IP network when the mobile communications device is within radio range of the access point, wherein the access point is in an area that lacks cellular coverage of the mobile communications network, and wherein the access point data and the mobile communications device data are received from the mobile communications device through the mobile communications network when the mobile communications device is located in an area covered by the cellular coverage of the mobile communications network,
        accessing subscriber information associated with a subscriber, and
        providing an authorization for the mobile communications device to communicate with the mobile communications network via the unlicensed network and through the IP network if either:
            the subscriber information indicates that the access point, being associated with the access point data, is one of a predetermined maximum number of authorized access points for the mobile communications device, or
            the subscriber information contains less than the predetermined maximum number of authorized access points, in which case the system amends the subscriber information to record the access point as an authorized access point, and authorizes the mobile communications device to communicate with the mobile communications network via the unlicensed network and through the IP network.

2. The system of claim 1, wherein the operations further comprise automatically limiting access to the unlicensed network if the system determines that the mobile communications device is allowed access to the mobile communications network via another unlicensed network.

3. The system of claim 1, wherein the mobile communications device is a multi-mode cellular telephone handset or a cellular telephone that is voice over Internet protocol-capable.

4. The system of claim 1, wherein the mobile communications network comprises a global system for mobile communications network.

5. The system of claim 1, wherein the operations further comprise receiving basic service set identifier data of the access point data transmitted from the mobile communications device via an unstructured supplementary service data message.

6. The system of claim 1, wherein the processor and computer-readable storage device are part of a generic access network.

7. The system of claim 1, further comprising a signaling system number 7 entity, wherein the operations further comprise communicating messages between the mobile communications device and the system via the signaling system number 7 entity.

8. The system of claim 1, wherein the operations further comprise facilitating an authorization process by transmitting the mobile communications device data and the access point data over-the-air, wherein the mobile communications device data and the access point data are used to authorize communications via the unlicensed network.

9. The system of claim 1, wherein the unlicensed network is an IEEE 802.11-based network.

10. The system of claim 1, wherein the operations further comprise restricting changes to the subscriber information such that the subscriber is limited to a fixed number of changes to the system in relation to the mobile communications device within a predetermined time period.

11. The system of claim 1, wherein the operations further comprise:
- detecting a plurality of access points and associated unique access point data, the associated unique access point data being basic service set identifier data;
- prioritizing the basic service set identifier data based on received signal strength data associated with the plurality of access points; and
- presenting a prioritized list of the basic service set identifier data to a user for selection.

12. A method comprising:
- receiving, by a system comprising a processor, from a mobile communications device through a mobile communications network, access point data associated with an access point and mobile communications device data associated with the mobile communications device, wherein the access point data is received, via an unlicensed network, by the mobile communications device from the access point associated with an IP network when the mobile communications device is within radio range of the access point, wherein the access point is in an area that lacks cellular coverage of the mobile communications network, and wherein the access point data and the mobile communications device data are received from the mobile communications device through the mobile communications network when the mobile communications device is located in an area covered by the cellular coverage of the mobile communications network;
- accessing, by the system comprising the processor, subscriber information associated with a subscriber; and
- providing, by the system comprising the processor, an authorization for the mobile communications device to communicate with the mobile communications network via the unlicensed network and through the IP network if either:
  - the subscriber information indicates that the access point is one of a predetermined maximum number of authorized access points for the mobile communications device, or
  - the subscriber information contains less than the predetermined maximum number of authorized access points, in which case the system amends the subscriber information to record the access point as an authorized access point, and authorizes the mobile communications device to communicate with the mobile communications network via the unlicensed network and through the IP network.

13. The method of claim 12, further comprising adding the access point data and the mobile communications device data to a master database of the subscriber information associated with the subscriber, wherein the master database comprises an access control database.

14. The method of claim 12, further comprising restricting changes to the subscriber information such that the subscriber is limited to a fixed number of changes to the system in relation to the mobile communications device within a predetermined time period.

15. The method of claim 12, further comprising storing the access point data and the mobile communications device data in a master database in association with international mobile subscriber identity data associated with the mobile communications device.

16. The method of claim 12, wherein the unlicensed network is an IEEE 802.11-based network.

17. The method of claim 12, further comprising:
- detecting a plurality of access points and associated access point data, the associated access point data being a basic service set identifier data;
- prioritizing the basic service set identifier data based on received signal strength data associated with the plurality of access points; and
- presenting a prioritized list of the basic service set identifier data to the subscriber for selection.

18. The method of claim 12, further comprising automatically limiting, by the system, access to the unlicensed network if the system determines that the mobile communications device is allowed access to the mobile communications network via another unlicensed network.

* * * * *